US009873752B2

(12) United States Patent
Singh et al.

(10) Patent No.: US 9,873,752 B2
(45) Date of Patent: Jan. 23, 2018

(54) CATALYST PROCESS MODIFICATION AND POLYMERIZATION THEREOF

(71) Applicant: INDIAN OIL CORPORATION LTD., Bandra (East), Mumbai (IN)

(72) Inventors: Gurmeet Singh, Faridabad (IN); Bhasker Bantu, Faridabad (IN); Sukhdeep Kaur, Faridabad (IN); Naresh Kumar, Faridabad (IN); Mahender Singh Negi, Faridabad (IN); Mohasin Momin, Faridabad (IN); Rashmi Rani, Faridabad (IN); Gurpreet Singh Kapur, Faridabad (IN); Shashikant, Faridabad (IN)

(73) Assignee: INDIAN OIL CORPORATION LTD., Mumbai (IN)

( * ) Notice: Subject to any disclaimer, the term of this patent is extended or adjusted under 35 U.S.C. 154(b) by 0 days.

(21) Appl. No.: 15/007,095

(22) Filed: Jan. 26, 2016

(65) Prior Publication Data

US 2016/0215077 A1    Jul. 28, 2016

(30) Foreign Application Priority Data

Jan. 27, 2015 (IN) .......................... 268/MUM/2015

(51) Int. Cl.
 *C08F 10/06* (2006.01)
 *C08F 110/06* (2006.01)
(52) U.S. Cl.
 CPC ............ *C08F 10/06* (2013.01); *C08F 110/06* (2013.01)

(58) Field of Classification Search
 CPC .............................. C08F 10/06; C08F 110/06
 See application file for complete search history.

(56) References Cited

U.S. PATENT DOCUMENTS

| 2011/0152481 | A1 | 6/2011 | Chang | |
|---|---|---|---|---|
| 2013/0338321 | A1* | 12/2013 | Coalter, III | ............. C08F 10/00 526/125.7 |
| 2015/0152199 | A1* | 6/2015 | Bantu | ..................... C08F 10/00 526/124.3 |

FOREIGN PATENT DOCUMENTS

| WO | 2010/078494 A2 | 7/2010 |
|---|---|---|
| WO | 2011/068770 A1 | 6/2011 |
| WO | 2012/118883 A1 | 9/2012 |
| WO | 2014/013401 A1 | 1/2014 |
| WO | 2014/045259 A2 | 3/2014 |
| WO | 2014/045260 A2 | 3/2014 |

* cited by examiner

*Primary Examiner* — Catherine S Branch
(74) *Attorney, Agent, or Firm* — Maschoff Brennan

(57) ABSTRACT

The present invention describes a process for preparation of catalyst component comprising contacting magnesium based precursor along with an internal donor based on phenylene dioates with an acyl halides in a solvent to obtain a solid precatalyst component; and contacting the solid precatalyst component with transition metal compound to obtain the catalyst component. The present invention also relates to a process for preparation of a catalyst system from said catalyst component and preparation of a polyolefins having free flowing characteristics with bulk densities (BD) of at least about 0.3 g/cc from the catalyst system.

21 Claims, 2 Drawing Sheets

CATALYST PROCESS MODIFICATION AND POLYMERIZATION THEREOF

FIELD OF THE INVENTION

The present invention relates to a process of preparation of catalyst component using magnesium based precursor and internal donor based on phenylene dioates where the pretreatment of the precursor along with the internal donor with acyl halides before contact with transition metal compound leads to preparation of highly active catalyst system with improved soluble and better hydrogen response.

BACKGROUND OF THE INVENTION

Polyolefins have acquired a global status for itself in every field. The demand for polymers based on olefins has increased whether it is commodity or niche products. There is always a craving for better product hence a requirement of continuous improvement in Ziegler-Natta catalyst system as well as polymerization processes is there. Production of polyolefins having desired properties like narrow MWD for non woven or broad MWD for pipe, blow molding and films, high isotacticity, better comonomer incorporation are always in demand.

Ziegler-Natta catalyst system typically consists of transition metal halide normally titanium halide supported on metal compound which is typically magnesium dihalide. Along with transition metal, also there is organic component known as internal electron donor, which has typical role to play during catalyst synthesis and polymerization. The organic electron donors (Lewis base) that are being used as internal donors are organic compounds having oxygen, nitrogen, phosphorous and/or silicon components which may be in the form of acids, alcohols, esters, anhydrides, ketones etc. The current state of the art internal donors are organic compounds such as esters of phthalates, alkyl benzoate, succinates and 1,3-diethers which impart certain characteristics due to their chemical and electronic environment that enhances catalyst activity while imparting improved product properties like high melt flow index, good bulk density, narrow/broad molecular weight distributions and high isotacticity.

The role of internal donors in Ziegler-Natta catalyst is to stabilize the primary crystallites of magnesium dihalide which is generated in-situ. Apart from this, the internal donor also being better Lewis base have preferred coordination with the higher acidity coordination sites on magnesium dihalide matrix which in turn avoid the coordination of titanium and hence prevents the formation of inactive sites. They also increase the activity of low active sites.

WO/2012/118883 describes the processes for preparing procatalyst compositions where multiple contact steps with a halogenating agent are involved in the presence of a substituted phenylene aromatic diester and at least one other internal electron donor. The halogenating agent is a titanium halide having the formula $Ti(OR_e)_fX_h$ wherein $R_e$ and X are defined as above, f is an integer from 0 to 3; h is an integer from 1 to 4; and f+h is 4. The multi-contact procatalyst compositions produced from the processes improve polymer properties specifically it improves polymer bulk density. The procatalyst precursor described in this invention may be a magnesium moiety compound (MagMo), a mixed magnesium titanium compound (MagTi), or a benzoate-containing magnesium chloride compound (BenMag).

WO/2010/078494 describes procatalyst compositions having an internal electron donor based on substituted phenylene aromatic diester and optionally an electron donor component. Ziegler-Natta catalyst compositions containing the present procatalyst compositions exhibit high activity and produce propylene-based olefins with broad molecular weight distribution.

US20110152481 relates to catalyst systems containing solid catalyst components comprising titanium, magnesium, halogen and 1,8-naphthyl diaryloate internal electron donor compound; organoaluminum compounds and alkyl benzoate derivatives as external electron donors. The present invention also provides methods of making the catalyst systems, and methods of polymerizing or copolymerizing alpha-olefins using the catalyst systems.

Ziegler-Natta catalyst system has gone through continuous improvement in terms of better catalyst activity in olefin polymerization and at the same time production of polymer products having desirable properties with more simple and cleaner manner.

SUMMARY OF THE INVENTION

The present invention provides better catalyst activity in olefin polymerization and at the same time production of polymer products having desirable properties with more simple and cleaner manner. The phenylene dioates based internal donors have the advantage of providing the phthalate free catalyst composition as well as olefins based polymers derived from these catalyst compositions. Also the usage of transition metal compound, more particularly, transition metal halide i.e. titanium based halide is lower than what is being used in the present state of the art.

Accordingly, the present invention provides a process for preparation of catalyst component comprising:

(i) contacting magnesium based precursor along with an internal donor based on phenylene dioates with an acyl halides in a solvent to obtain a solid precatalyst component; and (ii) contacting the solid precatalyst component with transition metal compound to obtain the catalyst component.

In an embodiment of the present invention, the contact time of the step (i) is immediate to 5 h, and heated from temperature 10° C. to 200° C.

In one of the embodiment, the present invention, further comprising, repeating the contacting step (ii), one or more times for at least 10 minutes up to 60 minutes, at a temperature from about 25° C. to about 150° C.

In yet another embodiment of the present invention, the acyl halides is added prior to each contacting step (ii) and said addition of acyl halides is carried out for immediate to 30 min.

In another embodiment of the present invention, the magnesium based precursor is liquid in nature and is prepared by contacting magnesium source with organohalide and alcohol in presence of a solvent in a single step.

In another embodiment of the present invention, the magnesium based precursor is solid in nature and is prepared by first contacting the magnesium source with organohalide in presence of solvating agent as the first step and then followed by addition of alcohol.

In one embodiment of the present invention, the internal donor based on phenylene dioates having the following structure (A)

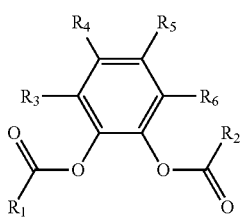

(A)

wherein $R_1$-$R_6$ groups are equal or different from each other and each of $R_1$-$R_6$ are selected from a group comprising of hydrogen, halogen, $C_1$-$C_{20}$ linear or branched alkyl group optionally linked with cyclic rings, $C_6$-$C_{14}$ aryl groups, $C_3$-$C_{15}$ cycloalkyl groups, $C_1$-$C_{20}$ alkoxy group, a heteroatom, and combinations thereof.

In yet another embodiment of the present invention, in the structure (A) at least one of $R_3$-$R_6$ is selected from a group comprising of hydrogen, halogen, $C_1$-$C_{20}$ linear or branched alkyl group optionally linked with cyclic ring, $C_6$-$C_{14}$ aryl groups, $C_3$-$C_{15}$ cycloalkyl groups, $C_1$-$C_{20}$ alkoxy group, a heteroatom, and combinations thereof and at least one of $R_1$-$R_2$ selected from a group comprising of hydrogen, halogen, $C_1$-$C_{20}$ linear or branched alkyl group optionally linked with cyclic ring, $C_3$-$C_{15}$ cycloalkyl groups, a heteroatom, and combinations thereof.

In one of the embodiment, the present invention further comprising the addition of another internal donor selected from a group comprising of phthalates, benzoates, diethers, succinates, malonates, carbonates, silyl esters, amide esters and combinations thereof.

In yet another embodiment of the present invention, the acyl halides is represented by RCOX where R is H, $C_1$-$C_{20}$ is linear or branched alkyl group which optionally linked with cyclic rings, $C_6$-$C_{14}$ aryl groups, $C_3$-$C_{15}$ cycloalkyl groups, $C_1$-$C_{20}$ alkoxy group, optionally containing heteroatom and X is selected from halides.

In yet another embodiment of the present invention, the molar ratio of magnesium to acyl halides is in the range of 1:5 to 1:0.0001.

In yet another embodiment of the present invention, the solvent is aromatic or aliphatic and polar or non polar in nature and selected from the group comprising of benzene, decane, kerosene, ethyl benzene, chlorobenzene, dichlorobenzene, toluene, o-chlorotoluene, xylene, dichloromethane, chloroform, cyclohexane and combination thereof.

In yet another embodiment of the present invention, the magnesium based precursor is contacted first with the internal donor followed by the contact of the acyl halides or magnesium based precursor is first contacted with the acyl halides followed by the contact with internal donor or the internal donor is mixed with the acyl halides and then contacted with the magnesium precursor in presence of the solvent.

In yet another embodiment of the present invention, the solid precatalyst component can be isolated.

In yet another embodiment of the present invention, the transition metal compound is selected from compounds represented by $M(OR')_pX_{4-p}$, where M is a transition metal and is selected from a group comprising of Ti, V, Zr, and Hf, preferably Ti; X is a halogen atom; R' is a hydrocarbon group and p is an integer having value equal to or less than 4, the transition metal halide is selected from a group comprising of transition metal tetrahalide, alkoxy transition metal trihalide/aryloxy transition metal trihalide, dialkoxy transition metal dihalide, trialkoxy transition metal monohalide, tetraalkoxy transition metal and mixtures thereof; wherein:

(a) the transition metal tetrahalide is selected from a group comprising of titanium tetrachloride, titanium tetrabromide and titanium tetraiodide and the likes for V, Zr and Hf;

(b) alkoxy transition metal trihalide/aryloxy transition metal trihalide is selected from a group comprising of methoxytitanium trichloride, ethoxytitanium trichloride, butoxytitanium trichloride and phenoxytitanium trichloride and the likes for V, Zr and Hf;

(c) dialkoxy transition metal dihalide is diethoxy transition metal dichloride and the likes for V, Zr and Hf;

(d) trialkoxy transition metal monohalide is triethoxy transition metal chloride and the likes for V, Zr and Hf; and (e) tetraalkoxy transition metal is selected from a group comprising of tetrabutoxy titanium and tetraethoxy titanium and the likes for V, Zr and Hf.

In yet another embodiment of the present invention, the solid precatalyst component is contacted with the transition metal compound at a temperature in the range of –50° C. to 150° C., and heating is instigated at a rate of 0.1 to 10.0° C./minute.

In yet another embodiment of the present invention, the transition metal compound is added in amounts ranging from 1 to 20 moles with respect to one mole of magnesium.

In yet another embodiment of the present invention, the contact with transition metal compound either neat or in solvent, and wherein the solvent is selected from a group comprising of chlorinated aromatic hydrocarbon, non chlorinated aromatic hydrocarbon, chlorinated aliphatic hydrocarbon, non chlorinated aliphatic hydrocarbon and combination thereof.

In yet another embodiment of the present invention, the solvent comprises 40 to 60 volume percent and selected from a group comprising of benzene, decane, kerosene, ethyl benzene, chlorobenzene, dichlorobenzene, toluene, o-chlorotoluene, xylene, dichloromethane, chloroform, cyclohexane and combination thereof.

The present invention also provides a catalyst composition comprising 5.0 wt % to 30 wt % of internal electron donor, 1.0 wt % to 6.0 wt % of transition metal and 15 wt % to 20 wt % of magnesium.

The present invention also provides a process for preparation of a catalyst system, said process comprising contacting the catalyst composition with at least one cocatalyst, and at least one external electron donor to obtain the catalyst system.

The present invention also provides a process of polymerizing and/or copolymerizing olefins to obtain a polyolefins having bulk densities (BD) of at least about 0.3 g/cc, said process comprising the step of contacting an olefin having C2 to C20 carbon atoms under a polymerizing condition with the catalyst system.

DETAILED DESCRIPTION OF THE INVENTION

Figure 1:
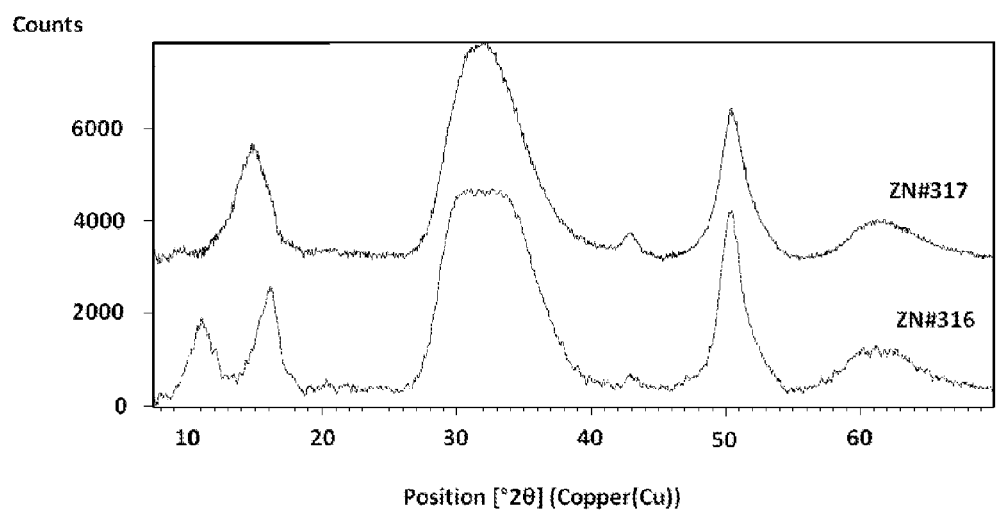
FIG. 1: XRD pattern of Zielger-Natta catalyst prepared in presence and absence of acyl halide.

While the invention is susceptible to various modifications and alternative forms, specific embodiment thereof will be described in detail below. It should be understood, however that it is not intended to limit the invention to the particular forms disclosed, but on the contrary, the invention is to cover all modifications, equivalents, and alternative falling within the scope of the invention as defined by the appended claims.

The present invention discloses the process of preparation of catalyst component where the magnesium based precursor is contacted with acyl halides in the presence of internal donor based on phenylene dioates and the solvent to obtain solid precatalyst component. Further treatment of the solid precatalyst component with transition metal compound in presence of the acyl halides led to formation of solid catalyst component. The catalyst system containing this solid catalyst component is able to polymerize olefins with high activity, good hydrogen response, with higher and better selectivity.

The present invention describes the process of preparation of catalyst component. In an embodiment, the solid precatalyst component is prepared through the process which requires contacting magnesium based precursor with acyl halides in the presence of internal donor based on phenylene dioates and the solvent. In another embodiment, the magnesium based precursor used in the present invention is prepared through the process as described in WO2014/045259 and WO2014/045260.

According to the present invention, the magnesium based precursor contains magnesium and may be liquid or solid in nature. In an embodiment, the magnesium based precursor is liquid in nature and prepared by contacting magnesium source with organohalide and alcohol in presence of the solvent in a single step.

In an embodiment, the magnesium based precursor is solid in nature and is prepared by first contacting the magnesium source with organohalide in presence of solvating agent as the first step and then followed by addition of alcohol. The solid magnesium based precursor is obtained either by removal of solvating agent or by precipitation methodology.

The present invention describes the process of preparation of catalyst component. In an embodiment, the solid precatalyst component is prepared through the process which requires contacting magnesium based precursor with acyl halides in the presence of internal donor based on phenylene dioates and the solvent. In an embodiment, phenylene dioates used as internal donors for Ziegler-Natta catalysts has the following structure (A)

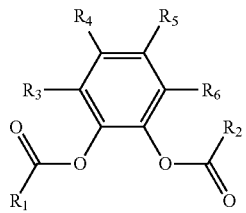

(A)

wherein $R_1$-$R_6$ groups are equal or different from each other and each of $R_1$-$R_6$ are selected from a group comprising of hydrogen, halogen, $C_1$-$C_{20}$ linear or branched alkyl group optionally linked with cyclic rings, $C_6$-$C_{14}$ aryl groups, $C_3$-$C_{15}$ cycloalkyl groups, $C_1$-$C_{20}$ alkoxy group, a heteroatom, and combinations thereof, provided that when $R_1$ is methyl or alkoxy or aryl; $R_2$ is other than methyl or alkoxy or aryl respectively.

Particularly, wherein the structure (A) includes at least one of $R_3$-$R_6$ selected from a group comprising of hydrogen, halogen, $C_1$-$C_{20}$ linear or branched alkyl group optionally linked with cyclic ring, $C_6$-$C_{14}$ aryl groups, $C_3$-$C_{15}$ cycloalkyl groups, $C_1$-$C_{20}$ alkoxy group, a heteroatom, and combinations thereof and at least one of $R_1$-$R_2$ selected from a group comprising of hydrogen, halogen, $C_1$-$C_{20}$ linear or branched alkyl group optionally linked with cyclic ring, $C_3$-$C_{15}$ cycloalkyl groups, a heteroatom, and combinations thereof, provided that when $R_1$ is methyl or alkoxy or aryl; $R_2$ is other than methyl or alkoxy or aryl respectively.

Non-limiting examples of structure (A) are the following: 1,2-phenylene dipropanoate, 1,2-phenylene dibutanoate, 1,2-phenylene dipentanoate, 1,2-phenylene dihexanoate, 1,2-phenylene diheptanoate, 1,2-phenylene dioctanoate, 1,2-phenylene dinonanoate, 1,2-phenylene didecanoate, 1,2-phenylene diundecanoate, 1,2-phenylene dipropionate, 2-(propionyloxy)phenyl butyrate, 2-(propionyloxy)phenyl pentanoate, 2-(propionyloxy)phenyl hexanoate, 2-(propionyloxy)phenyl heptanoate, 2-(propionyloxy)phenyl octanoate, 2-(propionyloxy)phenyl nonanoate, 2-(propionyloxy) phenyl decanoate, 2-(propionyloxy)phenyl undecanoate, 1,2-phenylene dibutyrate, 2-(butyryloxy)phenyl pentanoate, 2-(butyryloxy)phenyl hexanoate, 2-(butyryloxy)phenyl heptanoate, 2-(butyryloxy)phenyl octanoate, 2-(butyryloxy) phenyl nonanoate, 2-(butyryloxy)phenyl decanoate, 2-(butyryloxy)phenyl undecanoate, 1,2-phenylene dipentanoate, 2-(pentanoyloxy)phenyl hexanoate, 2-(pentanoyloxy)phenyl heptanoate, 2-(pentanoyloxy)phenyl octanoate, 2-(pentanoyloxy)phenyl nonanoate, 2-(pentanoyloxy)phenyl decanoate, 2-(pentanoyloxy)phenyl undecanoate, 1,2-phenylene dihexanoate, 2-(hexanoyloxy)phenyl heptanoate, 2-(hexanoyloxy)phenyl octanoate, 2-(hexanoyloxy)phenyl nonanoate, 2-(hexanoyloxy)phenyl decanoate, 2-(hexanoyloxy)phenyl undecanoate, 1,2-phenylene diheptanoate, 2-(heptanoyloxy)phenyl octanoate, 2-(heptanoyloxy)phenyl nonanoate, 2-(heptanoyloxy)phenyl decanoate, 2-(heptanoyloxy)phenyl undecanoate, 1,2-phenylene dioctanoate, 2-(octanoyloxy)phenyl nonanoate, 2-(octanoyloxy)phenyl decanoate, 2-(octanoyloxy)phenyl undecanoate, 1,2-phenylene dinonanoate, 2-(nonanoyloxy)phenyl decanoate, 2-(nonanoyloxy)phenyl undecanoate, 1,2-phenylene didecanoate, 2-(decanoyloxy)phenyl undecanoate, 1,2-phenylene diundecanoate, 2-acetoxyphenyl isobutyrate, 2-(propionyloxy)phenyl isobutyrate, 2-(isobutyryloxy)phenyl butyrate, 2-(isobutyryloxy)phenyl pentanoate, 2-(isobutyryloxy)phenyl hexanoate, 2-(isobutyryloxy)phenyl heptanoate, 2-(isobutyryloxy)phenyl octanoate, 2-(isobutyryloxy) phenyl nonanoate, 2-(isobutyryloxy)phenyl decanoate, 2-(isobutyryloxy)phenyl undecanoate, 1,2-phenylene diisobutyrate, 2-acetoxyphenyl 3-methylbutanoate, 2-(propionyloxy)phenyl 3-methylbutanoate, 2-(butyryloxy)phenyl 3-methylbutanoate, 2-(3-methylbutanoyloxy)phenyl pentanoate, 2-(3-methylbutanoyloxy)phenyl hexanoate, 2-(3-methylbutanoyloxy)phenyl heptanoate, 2-(3-methylbutanoyloxy)phenyl octanoate, 2-(3-methylbutanoyloxy) phenyl nonanoate, 2-(3-methylbutanoyloxy)phenyl decanoate, 2-(3-methylbutanoyloxy)phenyl undecanoate, 1,2-phenylene bis(3-methylbutanoate), 2-acetoxyphenyl 7-methyloctanoate, 2-(propionyloxy)phenyl 7-methyloctanoate, 2-(butyryloxy)phenyl 7-methyloctanoate, 2-(pentanoyloxy)phenyl 7-methyloctanoate, 2-(hexanoyloxy)phenyl 7-methyloctanoate, 2-(heptanoyloxy)phenyl 7-methyloctanoate, 2-(octanoyloxy)phenyl 7-methyloctanoate, 2-(7-methyloctanoyloxy)phenyl nonanoate, 2-(7-methyloctanoyloxy)phenyl decanoate, 2-(7-methyloctanoyloxy) phenyl undecanoate, 1,2-phenylene bis(7-methyloctanoate), 2-acetoxyphenyl 8-methylnonanoate, 2-(propionyloxy)phenyl 8-methylnonanoate, 2-(butyryloxy)phenyl 8-methylnonanoate, 2-(pentanoyloxy)phenyl 8-methylnonanoate, 2-(hexanoyloxy)phenyl 8-methylnonanoate, 2-(heptanoyloxy)phenyl 8-methylnonanoate, 2-(octanoyloxy)phenyl 8-methylnonanoate, 2-(nonanoyloxy)phenyl 8-methylnonanoate, 2-(8-methylnonanoyloxy)phenyl decanoate, 2-(8-methylnonanoyloxy)phenyl undecanoate, 1,2-phenylene bis(8-methylnonanoate), 2-acetoxyphenyl 9-methyldecanoate, 2-(propionyloxy)phenyl 9-methyldecanoate, 2-(butyryloxy)phenyl 9-methyldecanoate, 2-(pentanoyloxy)phenyl 9-methyldecanoate, 2-(hexanoyloxy)phenyl 9-methyldecanoate, 2-(heptanoyloxy)phenyl 9-methyldecanoate, 2-(octanoyloxy)phenyl 9-methyldecanoate, 2-(nonanoyloxy)phenyl 9-methyldecanoate, 2-(decanoyloxy)phenyl 9-methyldecanoate, 2-(9-methyldecanoyloxy)phenyl undecanoate, 1,2-phenylene bis(9-methyldecanoate), 2-acetoxyphenyl 10-methylundecanoate, 2-(propionyloxy)phenyl 10-methylundecanoate, 2-(butyryloxy)phenyl 10-methylundecanoate, 2-(pentanoyloxy)phenyl 10-methylundecanoate, 2-(hexanoyloxy)phenyl 10-methylundecanoate, 2-(heptanoyloxy)phenyl 10-methylundecanoate, 2-(octanoyloxy)phenyl 10-methylundecanoate, 2-(nonanoyloxy)phenyl 10-methylundecanoate, 2-(decanoyloxy)phenyl 10-methylundecanoate, 2-(undecanoyloxy)phenyl 10-methylundecanoate, 1,2-phenylene bis(10-methylundecanoate), 2-acetoxyphenyl pivalate, 2-(propionyloxy)phenyl pivalate, 2-(pivaloyloxy)phenyl butyrate, 2-(pivaloyloxy)phenyl pentanoate, 2-(pivaloyloxy)phenyl hexanoate, 2-(pivaloyloxy)phenyl heptanoate, 2-(pivaloyloxy)phenyl octanoate, 2-(pivaloyloxy)phenyl nonanoate, 2-(pivaloyloxy)phenyl decanoate, 2-(pivaloyloxy)phenyl undecanoate, 1,2-phenylene dipivalate, 2-acetoxyphenyl 3,3-dimethylbutanoate, 2-(propionyloxy)phenyl 3,3-dimethylbutanoate, 2-(butyryloxy)phenyl 3,3-dimethylbutanoate, 2-(3,3-dimethylbutanoyloxy)phenyl pentanoate, 2-(3,3-dimethylbutanoyloxy)phenyl hexanoate, 2-(3,3-dimethylbutanoyloxy)phenyl heptanoate, 2-(3,3-dimethylbutanoyloxy)phenyl octanoate, 2-(3,3-dimethylbutanoyloxy)phenyl nonanoate, 2-(3,3-dimethylbutanoyloxy)phenyl decanoate, 2-(3,3-dimethylbutanoyloxy)phenyl undecanoate, 1,2-phenylene bis(3,3-dimethylbutanoate), 2-acetoxyphenyl 4,4-dimethylpentanoate, 2-(propionyloxy)phenyl 4,4-dimethylpentanoate, 2-(butyryloxy)phenyl 4,4-dimethylpentanoate, 2-(pentanoyloxy)phenyl 4,4-dimethylpentanoate, 2-(4,4-dimethylpentanoyloxy)phenyl hexanoate, 2-(4,4-dimethylpentanoyloxy)phenyl heptanoate, 2-(4,4-dimethylpentanoyloxy)phenyl octanoate, 2-(4,4-dimethylpentanoyloxy)phenyl nonanoate, 2-(4,4-dimethylpentanoyloxy)phenyl decanoate, 2-(4,4-dimethylpentanoyloxy)phenyl undecanoate, 1,2-phenylene bis(4,4-dimethylpentanoate), 2-acetoxyphenyl 5,5-dimethylhexanoate, 2-(propionyloxy)phenyl 5,5-dimethylhexanoate, 2-(butyryloxy)phenyl 5,5-dimethylhexanoate, 2-(pentanoyloxy)phenyl 5,5-dimethylhexanoate, 2-(hexanoyloxy)phenyl 5,5-dimethylhexanoate, 2-(5,5-dimethylhexanoyloxy)phenyl heptanoate, 2-(5,5-dimethylhexanoyloxy)phenyl octanoate, 2-(5,5-dimethylhexanoyloxy)phenyl nonanoate, 2-(5,5-dimethylhexanoyloxy)phenyl decanoate, 2-(5,5-dimethylhexanoyloxy)phenyl undecanoate, 1,2-phenylene bis(5,5-dimethylhexanoate), 2-acetoxyphenyl 6,6-dimethylheptanoate, 2-(propionyloxy)phenyl 6,6-dimethylheptanoate, 2-(butyryloxy)phenyl 6,6-dimethylheptanoate, 2-(pentanoyloxy)phenyl 6,6-dimethylheptanoate, 2-(hexanoyloxy)phenyl 6,6-dimethylheptanoate, 2-(heptanoyloxy)phenyl 6,6-dimethylheptanoate, 2-(6,6-dimethylheptanoyloxy)phenyl octanoate, 2-(6,6-dimethylheptanoyloxy)phenyl nonanoate, 2-(6,6-dimethylheptanoyloxy)phenyl decanoate, 2-(6,6-dimethylheptanoyloxy)phenyl undecanoate, 1,2-phenylene bis(6,6-dimethylheptanoate), 2-acetoxyphenyl 7,7-dimethyloctanoate, 2-(propionyloxy)phenyl 7,7-dimethyloctanoate, 2-(butyryloxy)phenyl 7,7-dimethyloctanoate, 2-(pentanoyloxy)phenyl 7,7-dimethyloctanoate, 2-(hexanoyloxy)phenyl 7,7-dimethyloctanoate, 2-(heptanoyloxy)phenyl 7,7-dimethyloctanoate, 2-(octanoyloxy)phenyl 7,7-dimethyloctanoate, 2-(7,7-dimethyloctanoyloxy)phenyl nonanoate, 2-(7,7-dimethyloctanoyloxy)phenyl decanoate, 2-(7,7-dimethyloctanoyloxy)phenyl undecanoate, 1,2-phenylene bis(7,7-dimethyloctanoate), 2-acetoxyphenyl 8,8-dimethylnonanoate, 2-(propionyloxy)phenyl 8,8-dimethylnonanoate, 2-(butyryloxy)phenyl 8,8-dimethylnonanoate, 2-(pentanoyloxy)phenyl 8,8-dimethylnonanoate, 2-(hexanoyloxy)phenyl 8,8-dimethylnonanoate, 2-(heptanoyloxy)phenyl 8,8-dimethylnonanoate, 2-(octanoyloxy)phenyl 8,8-dimethylnonanoate, 2-(nonanoyloxy)phenyl 8,8-dimethylnonanoate, 2-(8,8-dimethylnonanoyloxy)phenyl decanoate, 2-(8,8-dimethylnonanoyloxy)phenyl undecanoate, 1,2-phenylene bis(8,8-dimethylnonanoate), 2-acetoxyphenyl 9,9-dimethyldecanoate, 2-(propionyloxy)phenyl 9,9-dimethyldecanoate, 2-(butyryloxy)phenyl 9,9-dimethyldecanoate, 2-(pentanoyloxy)phenyl 9,9-dimethyldecanoate, 2-(hexanoyloxy)phenyl 9,9-dimethyldecanoate, 2-(heptanoyloxy)phenyl 9,9-dimethyldecanoate, 2-(octanoyloxy)phenyl 9,9-dimethyldecanoate, 2-(nonanoyloxy)phenyl 9,9-dimethyldecanoate, 2-(decanoyloxy)phenyl 9,9-dimethyldecanoate, 2-(9,9-dimethyldexanoyloxy)phenyl undecanoate, 1,2-phenylene bis(9,9-dimethyldecanoate), 2-acetoxyphenyl 10,10-dimethylundecanoate, 2-(propionyloxy)phenyl 10,10-dimethylundecanoate, 2-(butyryloxy)phenyl 10,10-dimethylundecanoate, 2-(pentanoyloxy)phenyl 10,10-dimethylundecanoate, 2-(hexanoyloxy)phenyl 10,10-dimethylundecanoate, 2-(heptanoyloxy)phenyl 10,10-dimethylundecanoate, 2-(octanoyloxy)phenyl 10,10-dimethylundecanoate, 2-(nonanoyloxy)phenyl 10,10-dimethylundecanoate, 2-(decanoyloxy)phenyl 10,10-dimethylundecanoate, 2-(undecanoyloxy)phenyl 10,10-dimethylundecanoate, 1,2-phenylene bis(10,10-dimethylundecanoate), 2-acetoxyphenyl 2-ethylbutanoate, 2-(propionyloxy)phenyl 2-ethylbutanoate, 2-(butyryloxy)phenyl 2-ethylbutanoate, 2-(2-ethylbutanoyloxy)phenyl pentanoate, 2-(2-ethylbutanoyloxy)phenyl hexanoate, 2-(2-ethylbutanoyloxy)phenyl heptanoate, 2-(2-ethylbutanoyloxy)phenyl octanoate, 2-(2-ethylbutanoyloxy)phenyl nonanoate, 2-(2-ethylbutanoyloxy)phenyl decanoate, 2-(2-ethylbutanoyloxy)phenyl undecanoate, 1,2-phenylene bis(2-ethylbutanoate), 2-acetoxyphenyl 3-ethylpentanoate, 2-(propionyloxy)phenyl 3-ethylpentanoate, 2-(butyryloxy)phenyl 3-ethylpentanoate, 2-(pentanoyloxy)phenyl 3-ethylpentanoate, 2-(3-ethylpentanoyloxy)phenyl hexanoate, 2-(3-ethylpentanoyloxy)phenyl heptanoate, 2-(3-ethylpentanoyloxy)phenyl octanoate, 2-(3-ethylpentanoyloxy)phenyl nonanoate, 2-(3-ethylpentanoyloxy)phenyl decanoate, 2-(3-ethylpentanoyloxy)phenyl undecanoate, 1,2-phenylene bis(3-ethylpentanoate), 2-acetoxyphenyl 4-ethylhexanoate, 2-(propionyloxy)phenyl 4-ethylhexanoate, 2-(butyryloxy)phenyl 4-ethylhexanoate, 2-(pentanoyloxy)phenyl 4-ethylhexanoate, 2-(hexanoyloxy)phenyl 4-ethylhexanoate, 2-(4-ethylhexanoyloxy)phenyl heptanoate, 2-(4-ethylhexanoyloxy)phenyl octanoate, 2-(4-ethylhexanoyloxy)phenyl nonanoate, 2-(4-ethylhexanoyloxy)phenyl decanoate, 2-(4-ethylhexanoyloxy)phenyl undecanoate, 1,2-phenylene bis(4-ethylhexanoate), 2-acetoxyphenyl 6-ethyloctanoate, 2-(propionyloxy)phenyl 6-ethyloctanoate, 2-(butyryloxy)phenyl 6-ethyloctanoate, 2-(pentanoyloxy)phenyl 6-ethyloctanoate, 2-(hexanoyloxy)phenyl 6-ethyloctanoate, 2-(heptanoyloxy)phenyl 6-ethyloctanoate, 2-(octanoyloxy)phenyl 6-ethyloctanoate, 2-(6-ethyloctanoyloxy)phenyl nonanoate, 2-(6-ethyloctanoyloxy)phenyl decanoate, 2-(6-ethyloctanoyloxy)phenyl undecanoate, 1,2-phenylene bis(6-ethyloctanoate), 2-acetoxyphenyl 7-ethylnonanoate, 2-(propionyloxy)phenyl 7-ethylnonanoate, 2-(butyryloxy)phenyl 7-ethylnonanoate, 2-(pentanoyloxy)phenyl 7-ethylnonanoate, 2-(hexanoyloxy)phenyl 7-ethylnonanoate, 2-(heptanoyloxy)phenyl 7-ethylnonanoate, 2-(octanoyloxy)phenyl 7-ethylnonanoate, 2-(nonanoyloxy)phenyl 7-ethylnonanoate, 2-(7-ethylnonanoyloxy)phenyl decanoate, 2-(7-ethylnonanoyloxy)phenyl undecanoate, 1,2-phenylene bis(7-ethylnonanoate), 2-acetoxyphenyl 8-ethyldecanoate, 2-(propionyloxy)phenyl 8-ethyldecanoate, 2-(butyryloxy)phenyl 8-ethyldecanoate, 2-(pentanoyloxy)phenyl 8-ethyldecanoate, 2-(hexanoyloxy)phenyl 8-ethyldecanoate, 2-(heptanoyloxy)phenyl 8-ethyldecanoate, 2-(octanoyloxy)phenyl 8-ethyldecanoate, 2-(nonanoyloxy)phenyl 8-ethyldecanoate, 2-(decanoyloxy)phenyl 8-ethyldecanoate, 2-(8-ethyldecanoyloxy)phenyl undecanoate, 1,2-phenylene bis(8-ethyldecanoate), 2-acetoxyphenyl 9-ethylundecanoate, 2-(propionyloxy)phenyl 9-ethylundecanoate, 2-(butyryloxy)phenyl 9-ethylundecanoate, 2-(pentanoyloxy)phenyl 9-ethylundecanoate, 2-(hexanoyloxy)phenyl 9-ethylundecanoate, 2-(heptanoyloxy)phenyl 9-ethylundecanoate, 2-(octanoyloxy)phenyl 9-ethylundecanoate, 2-(nonanoyloxy)phenyl 9-ethylundecanoate, 2-(decanoyloxy)phenyl 9-ethylundecanoate, 1,2-phenylene bis(9-ethylundecanoate), 2-acetoxyphenyl 2-methylbutanoate, 2-(propionyloxy)phenyl 2-methylbutanoate, 2-(butyryloxy)phenyl 2-methylbutanoate, 2-(2-methylbutanoyloxy)phenyl pentanoate, 2-(2-methylbutanoyloxy)phenyl hexanoate, 2-(2-methylbutanoyloxy)phenyl heptanoate, 2-(2-methylbutanoyloxy)phenyl octanoate, 2-(2-methylbutanoyloxy)phenyl nonanoate, 2-(2-methylbutanoyloxy)phenyl decanoate, 2-(2-methylbutanoyloxy)phenyl undecanoate, 1,2-phenylene bis(2-methylbutanoate), 2-acetoxyphenyl 2-methylpentanoate, 2-(propionyloxy)phenyl 2-methylpentanoate, 2-(butyryloxy)phenyl 2-methylpentanoate, 2-(pentanoyloxy)phenyl 2-methylpentanoate, 2-(2-methylpentanoyloxy)phenyl hexanoate, 2-(2-methylpentanoyloxy)phenyl heptanoate, 2-(2-methylpentanoyloxy)phenyl octanoate, 2-(2-methylpentanoyloxy)phenyl nonanoate, 2-(2-methylpentanoyloxy)phenyl decanoate, 1,2-phenylene bis(2-methylpentanoate), 2-acetoxyphenyl 2-methylhexanoate, 2-(propionyloxy)phenyl 2-methylhexanoate, 2-(butyryloxy)phenyl 2-methylhexanoate, 2-(pentanoyloxy)phenyl 2-methylhexanoate, 2-(hexanoyloxy)phenyl 2-methylhexanoate, 2-(2-methylhexanoyloxy)phenyl heptanoate, 2-(2-methylhexanoyloxy)phenyl octanoate, 2-(2-methylhexanoyloxy)phenyl nonanoate, 2-(2-methylhexanoyloxy)phenyl decanoate, 2-(2-methylhexanoyloxy)phenyl undecanoate, 1,2-phenylene bis(2-methylhexanoate), 2-acetoxyphenyl 2-methylheptanoate, 2-(propionyloxy)phenyl 2-methylheptanoate, 2-(butyryloxy)phenyl 2-methylheptanoate, 2-(pentanoyloxy)phenyl 2-methylheptanoate, 2-(hexanoyloxy)phenyl 2-methylheptanoate, 2-(heptanoyloxy)phenyl 2-methylheptanoate, 2-(2-methylheptanoyloxy)phenyl octanoate, 2-(2-methylheptanoyloxy)phenyl nonanoate, 2-(2-methylheptanoyloxy)phenyl decanoate, 2-(2-methylheptanoyloxy)phenyl undecanoate, 1,2-phenylene bis(2-methylheptanoate), 2-acetoxyphenyl 2-methyloctanoate, 2-(propionyloxy)phenyl 2-methyloctanoate, 2-(butyryloxy)phenyl 2-methyloctanoate, 2-(pentanoyloxy)phenyl 2-methyloctanoate, 2-(hexanoyloxy)phenyl 2-methyloctanoate, 2-(heptanoyloxy)phenyl 2-methyloctanoate, 2-(octanoyloxy)phenyl 2-methyloctanoate, 2-(2-methyloctanoyloxy)phenyl nonanoate, 2-(2-methyloctanoyloxy)phenyl decanoate, 2-(2-methyloctanoyloxy)phenyl undecanoate, 1,2-phenylene bis(2-methyloctanoate), 2-acetoxyphenyl 2-methylnonanoate, 2-(propionyloxy)phenyl 2-methylnonanoate, 2-(butyryloxy)phenyl 2-methylnonanoate, 2-(pentanoyloxy)phenyl 2-methylnonanoate, 2-(hexanoyloxy)phenyl 2-methylnonanoate, 2-(heptanoyloxy)phenyl 2-methylnonanoate, 2-(octanoyloxy)phenyl 2-methylnonanoate, 2-(nonanoyloxy)phenyl 2-methylnonanoate, 2-(2-methylnonanoyloxy)phenyl decanoate, 2-(2-methylnonanoyloxy)phenyl undecanoate, 1,2-phenylene bis(2-methylnonanoate), 2-acetoxyphenyl 2-methyldecanoate, 2-(propionyloxy)phenyl 2-methyldecanoate, 2-(butyryloxy)phenyl 2-methyldecanoate, 2-(pentanoyloxy)phenyl 2-methyldecanoate, 2-(hexanoyloxy)phenyl 2-methyldecanoate, 2-(heptanoyloxy)phenyl 2-methyldecanoate, 2-(octanoyloxy)phenyl 2-methyldecanoate, 2-(nonanoyloxy)phenyl 2-methyldecanoate, 2-(decanoyloxy)phenyl 2-methyldecanoate, 2-(2-methyldecanoyloxy)phenyl undecanoate, 1,2-phenylene bis(2-methyldecanoate), 2-acetoxyphenyl 2-propylpentanoate, 2-(propionyloxy)phenyl 2-propylpentanoate, 2-(butyryloxy)phenyl 2-propylpentanoate, 2-(pentanoyloxy)phenyl 2-propylpentanoate, 2-(2-propylpentanoyloxy)phenyl hexanoate, 2-(2-propylpentanoyloxy)phenyl heptanoate, 2-(2-propylpentanoyloxy)phenyl octanoate, 2-(2-propylpentanoyloxy)phenyl nonanoate, 2-(2-propylpentanoyloxy)phenyl decanoate, 2-(2-propylpentanoyloxy)phenyl undecanoate, 1,2-phenylene bis(2-propylpentanoate), 2-acetoxyphenyl 2-propylhexanoate, 2-(propionyloxy)phenyl 2-propylhexanoate, 2-(butyryloxy)phenyl 2-propylhexanoate, 2-(pentanoyloxy)phenyl 2-propylhexanoate, 2-(hexanoyloxy)phenyl 2-propylhexanoate, 2-(2-propylhexanoyloxy)phenyl heptanoate, 2-(2-propylhexanoyloxy)phenyl octanoate, 2-(2-propylhexanoyloxy)phenyl nonanoate, 2-(2-propylhexanoyloxy)phenyl decanoate, 2-(2-propylhexanoyloxy)phenyl undecanoate, 1,2-phenylene bis(2-propylhexanoate), 2-acetoxyphenyl 2-propylheptanoate, 2-(propionyloxy)phenyl 2-propylheptanoate, 2-(butyryloxy)phenyl 2-propylheptanoate, 2-(pentanoyloxy)phenyl 2-propylheptanoate, 2-(hexanoyloxy)phenyl 2-propylheptanoate, 2-(heptanoyloxy)phenyl 2-propylheptanoate, 2-(2-propylheptanoyloxy)phenyl octanoate, 2-(2-propylheptanoyloxy)phenyl nonanoate, 2-(2-propylheptanoyloxy)phenyl decanoate, 2-(2-propylheptanoyloxy)phenyl undecanoate, 1,2-phenylene bis(2-propylheptanoate), 2-acetoxyphenyl 2-propyloctanoate, 2-(propionyloxy)phenyl 2-propyloctanoate, 2-(butyryloxy)phenyl 2-propyloctanoate, 2-(pentanoyloxy)phenyl 2-propyloctanoate, 2-(hexanoyloxy)phenyl 2-propyloctanoate, 2-(heptanoyloxy)phenyl 2-propyloctanoate, 2-(octanoyloxy)phenyl 2-propyloctanoate, 2-(2-propyloctanoyloxy)phenyl nonanoate, 2-(2-propyloctanoyloxy)phenyl decanoate, 2-(2-propyloctanoyloxy)phenyl undecanoate, 1,2-phenylene bis(2-propyloctanoate), 2-acetoxyphenyl 2-propylnonanoate, 2-(propionyloxy)phenyl 2-propylnonanoate, 2-(butyryloxy)phenyl 2-propylnonanoate, 2-(pentanoyloxy)phenyl 2-propylnonanoate, 2-(hexanoyloxy)phenyl 2-propylnonanoate, 2-(heptanoyloxy)phenyl 2-propylnonanoate, 2-(octanoyloxy)phenyl 2-propylnonanoate, 2-(nonanoyloxy)phenyl 2-propylnonanoate, 2-((2-propylnonanoyl)oxy)phenyl decanoate, 2-((2-propylnonanoyl)oxy)phenyl undecanoate, 1,2-phenylene bis(2-propylnonanoate), 2-acetoxyphenyl 2-propyldecanoate, 2-(propionyloxy)phenyl 2-propyldecanoate, 2-(butyryloxy)phenyl 2-propyldecanoate, 2-(pentanoyloxy) phenyl 2-propyldecanoate, 2-(hexanoyloxy)phenyl 2-propyldecanoate, 2-(heptanoyloxy)phenyl 2-propyldecanoate, 2-(octanoyloxy)phenyl 2-propyldecanoate, 2-(nonanoyloxy) phenyl 2-propyldecanoate, 2-(decanoyloxy)phenyl 2-propyldecanoate, 1,2-phenylene bis(2-propyldecanoate), 2-acetoxyphenyl 2,3-dimethylbutanoate, 2-(propionyloxy) phenyl 2,3-dimethylbutanoate, 2-(butyryloxy)phenyl 2,3-dimethylbutanoate, 2-(2,3-dimethylbutanoyloxy)phenyl pentanoate, 2-(2,3-dimethylbutanoyloxy)phenyl hexanoate, 2-(2,3-dimethylbutanoyloxy)phenyl heptanoate, 2-(2,3-dimethylbutanoyloxy)phenyl octanoate, 2-(2,3-dimethylbutanoyloxy)phenyl nonanoate, 2-(2,3-dimethylbutanoyloxy) phenyl decanoate, 2-(2,3-dimethylbutanoyloxy)phenyl undecanoate, 1,2-phenylene bis(2,3-dimethylbutanoate), 1,2-phenylene diisopropanoate, 1,2-phenylene diisobutanoate, 1,2-phenylene di t-butanoate, 1,2-phenylene diisopentanoate, 1,2-phenylene dicyclopropyloate, 1,2-phenylene dicyclobutyloate, 1,2-phenylene dicyclopentyloate, 1,2-phenylene dicyclohexyloate, 1,2-phenylene dicycloheptyloate, 1,2-phenylene dicyclooctyloate, 1,2-phenylene bis(4-methylpentanoate), 1,2-phenylene bis(5-methylhexanoate), 1,2-phenylene bis(6-methylheptanoate), 1,2-phenylene bis(7-methyloctanoate), 1,2-phenylene bis(8-methylnonanoate), 1,2-phenylene bis(9-methyldecanoate), 1,2-phenylene bis (10-methylundecanoate), 1,2-phenylene bis(6,6-dimethylheptanoate), 1,2-phenylene bis(2-ethylhexanoate), 1,2-phenylene bis(3-methylbutanoate), 1,2-phenylene bis(3,3-dimethylbutanoate), 2-acetoxyphenyl propaonate, 2-acetoxyphenyl butyrate, 2-acetoxyphenyl pentanoate, 2-acetoxyphenyl heptanoate, 2-acetoxyphenyl octanoate, 2-acetoxyphenyl nonanoate, 2-acetoxyphenyl decanoate, 2-acetoxyphenyl undecanoate, 2-(isobutyryloxy)phenyl acetate, 2-(isobutyryloxy)phenyl propionate, 2-(isobutyryloxy)phenyl benzoate, 2-(isobutyryloxy)phenyl isopropionate, 2-(isobutyryloxy)phenyl isobutyrate, 2-(isobutyryloxy)phenyl isopentanoate, 2-(isobutyryloxy)phenyl isohexanoate, 2-(isobutyryloxy)phenyl isoheptanoate, 2-(isobutyryloxy)phenyl isooctanoate, 2-(isobutyryloxy) phenyl isononanoate, 2-(isobutyryloxy)phenyl isodecanoate, 2-(isobutyryloxy)phenyl isoundecanoate, 2-acetoxyphenyl 4-methylpentanoate, 2-(propionyloxy)phenyl 4-methylpentanoate, 2-(butyryloxy)phenyl 4-methylpentanoate, 2-(pentanoyloxy)phenyl 4-methylpentanoate, 2-(4-methylpentanoyloxy)phenyl hexanoate, 2-(4-methylpentanoyloxy)phenyl heptanoate, 2-(4-methylpentanoyloxy) phenyl octanoate, 2-(4-methylpentanoyloxy)phenyl nonanoate, 2-(4-methylpentanoyloxy)phenyl decanoate, 2-(4-methylpentanoyloxy)phenyl undecanoate, 2-acetoxyphenyl 5-methylhexanoate, 2-(propionyloxy)phenyl 5-methylhexanoate, 2-(butyryloxy)phenyl 5-methylhexanoate, 2-(pentanoyloxy)phenyl 5-methylhexanoate, 2-(hexanoyloxy)phenyl 5-methylhexanoate, 2-(5-methylhexanoyloxy)phenyl heptanoate, 2-(5-methylhexanoyloxy) phenyl octanoate, 2-(5-methylhexanoyloxy)phenyl nonanoate, 2-(5-methylhexanoyloxy)phenyl decanoate, 2-(5-methylhexanoyloxy)phenyl undecanoate, 2-acetoxyphenyl 6-methylheptanoate, 2-(propionyloxy)phenyl 6-methylheptanoate, 2-(butyryloxy)phenyl 6-methylheptanoate, 2-(pentanoyloxy)phenyl 6-methylheptanoate, 2-(hexanoyloxy) phenyl 6-methylheptanoate, 2-(heptanoyloxy)phenyl 6-methylheptanoate, 2-(6-methylheptanoyloxy)phenyl octanoate, 2-(6-methylheptanoyloxy)phenyl nonanoate, 2-(6-methylheptanoyloxy)phenyl decanoate, 2-(6-methylheptanoyloxy)phenyl undecanoate, 2-acetoxyphenyl 9-ethylundecanoate, 2-(propionyloxy)phenyl 9-ethylundecanoate, 2-(butyryloxy)phenyl 9-ethylundecanoate, 2-(pentanoyloxy)phenyl 9-ethylundecanoate, 2-(hexanoyloxy)phenyl 9-ethylundecanoate, 2-(heptanoyloxy)phenyl 9-ethylundecanoate, 2-(octanoyloxy)phenyl 9-ethylundecanoate, 2-(nonanoyloxy)phenyl 9-ethylundecanoate, 2-(decanoyloxy)phenyl 9-ethylundecanoate, 4-chloro-1,2-phenylene diacetate, 4-bromo-1,2-phenylene diacetate, 4-fluro-1,2-phenylene diacetate, 4-iodo-1,2-phenylene diacetate, 4-methyl-1,2-phenylene diacetate, 4-ethyl-1,2-phenylene diacetate, 4-butyl-1,2-phenylene diacetate, 4-isobutyl-1,2-phenylene diacetate, 4-tert-butyl-1,2-phenylene diacetate, 4-isopropyl-1,2-phenylene diacetate, 4-pentyl-1,2-phenylene diacetate, 4-isopentyl-1,2-phenylene diacetate, 4-hexyl-1,2-phenylene diacetate, 4-heptyl-1,2-phenylene diacetate, 4-octyl-1,2-phenylene diacetate, 4-nonyl-1,2-phenylene diacetate, 4-decyl-1,2-phenylene diacetate, 4-dodecyl-1,2-phenylene diacetate, 4-methoxy-1,2-phenylene diacetate, 4-ethoxy-1,2-phenylene diacetate, 4-propoxy-1,2-phenylene diacetate, 4-isopropoxy-1,2-phenylene diacetate, 4-butoxy-1,2-phenylene diacetate, 4-isobutoxy-1,2-phenylene diacetate, 4-tert-butoxy-1,2-phenylene diacetate, 4-pentoxy-1,2-phenylene diacetate, 4-hexoxy-1,2-phenylene diacetate, 4-heptoxy-1,2-phenylene diacetate, 4-octoxy-1,2-phenylene diacetate, 4-nonoxy-1,2-phenylene diacetate, 4-decoxy-1,2-phenylene diacetate, 4-phenoxy-1,2-phenylene diacetate, 4-chloro-1,2-phenylene diisopropanoate, 4-bromo-1,2-phenylene diisopropanoate, 4-fluro-1,2-phenylene diisopropanoate, 4-iodo-1,2-phenylene diisopropanoate, 4-methyl-1,2-phenylene diisopropanoate, 4-ethyl-1,2-phenylene diisopropanoate, 4-butyl-1,2-phenylene diisopropanoate, 4-isobutyl-1,2-phenylene diisopropanoate, 4-tert-butyl-1,2-phenylene diisopropanoate, 4-isopropyl-1,2-phenylene diisopropanoate, 4-pentyl-1,2-phenylene diisopropanoate, 4-isopentyl-1,2-phenylene diisopropanoate 4-hexyl-1,2-phenylene diisopropanoate, 4-heptyl-1,2-phenylene diisopropanoate, 4-octyl-1,2-phenylene diisopropanoate, 4-nonyl-1,2-phenylene diisopropanoate, 4-decyl-1,2-phenylene diisopropanoate, 4-dodecyl-1,2-phenylene diisopropanoate, 4-methoxy-1,2-phenylene diisopropanoate 4-ethoxy-1,2-phenylene diisopropanoate, 4-propoxy-1,2-phenylene diisopropanoate, 4-isopropoxy-1,2-phenylene diisopropanoate, 4-butoxy-1,2-phenylene diisopropanoate, 4-isobutoxy-1,2-phenylene diisopropanoate, 4-tert-butoxy-1,2-phenylene dipropaonate, 4-pentoxy-1,2-phenylene diisopropanoate, 4-hexoxy-1,2-phenylene diisopropanoate, 4-heptoxy-1,2-phenylene diisopropanoate, 4-octoxy-1,2-phenylene diisopropanoate, 4-nonoxy-1,2-phenylene diisopropanoate, 4-decoxy-1,2-phenylene diisopropanoate, 4-phenoxy-1,2-phenylene diisopropanoate, 4-chloro-1,2-phenylene diisopropanoate, 4-bromo-1,2-phenylene diisopropanoate, 4-fluro-1,2-phenylene diisopropanoate, 4-iodo-1,2-phenylene diisopropanoate, 4-methyl-1,2-phenylene diisopropanoate, 4-ethyl-1,2-phenylene diisopropanoate, 4-butyl-1,2-phenylene diisopropanoate, 4-isobutyl-1,2-phenylene diisopropanoate, 4-tert-butyl-1,2-phenylene diisopropanoate, 4-isopropyl-1,2-phenylene diisopropanoate, 4-pentyl-1,2-phenylene diisopropanoate, 4-isopentyl-1,2-phenylene diisopropanoate, 4-hexyl-1,2-phenylene diisopropanoate, 4-heptyl-1,2-phenylene diisopropanoate, 4-octyl-1,2-phenylene diisopropanoate, 4-nonyl-1,2-phenylene diisopropanoate, 4-decyl-1,2-phenylene diisopropanoate, 4-dodecyl-1,2-phenylene diisopropanoate, 4-methoxy-1,2-phenylene diisopropanoate, 4-ethoxy-1,2-phenylene diisopropanoate, 4-propoxy-1,2-phenylene diisopropanoate, 4-isopropoxy-1,2-phenylene diisopropanoate, 4-butoxy-1,2-phenylene diisopropanoate, 4-isobutoxy-1,2-phenylene diisopropanoate, 4-tert-butoxy-1,2-phenylene diisopropanoate, 4-pentoxy-1,2-phenylene diisopropanoate, 4-hexoxy-1,2-phenylene diisopropanoate, 4-heptoxy-1,2-phenylene diisopropanoate, 4-octoxy-1,2-phenylene diisopropanoate, 4-nonoxy-1,2-phenylene diisopropanoate, 4-decoxy-1,2-phenylene diisopropanoate, 4-phenoxy-1,2-phenylene diisopropanoate, 4-chloro-1,2-phenylene dibutanoate, 4-bromo-1,2-phenylene dibutanoate, 4-fluro-1,2-phenylene dibutanoate, 4-iodo-1,2-phenylene dibutanoate, 4-methyl-1,2-phenylene dibutanoate, 4-ethyl-1,2-phenylene dibutanoate, 4-butyl-1,2-phenylene dibutanoate, 4-isobutyl-1,2-phenylene dibutanoate, 4-tert-butyl-1,2-phenylene dibutanoate, 4-isopropyl-1,2-phenylene dibutanoate, 4-pentyl-1,2-phenylene dibutanoate, 4-isopentyl-1,2-phenylene dibutanoate, 4-hexyl-1,2-phenylene dibutanoate, 4-heptyl-1,2-phenylene dibutanoate, 4-octyl-1,2-phenylene dibutanoate, 4-nonyl-1,2-phenylene dibutanoate, 4-decyl-1,2-phenylene dibutanoate, 4-dodecyl-1,2-phenylene dibutanoate, 4-methoxy-1,2-phenylene dibutanoate, 4-ethoxy-1,2-phenylene dibutanoate, 4-propoxy-1,2-phenylene dibutanoate, 4-isopropoxy-1,2-phenylene dibutanoate, 4-butoxy-1,2-phenylene dibutanoate, 4-isobutoxy-1,2-phenylene dibutanoate, 4-tert-butoxy-1,2-phenylene dibutanoate, 4-pentoxy-1,2-phenylene dibutanoate, 4-hexoxy-1,2-phenylene dibutanoate, 4-heptoxy-1,2-phenylene dibutanoate, 4-octoxy-1,2-phenylene dibutanoate, 4-nonoxy-1,2-phenylene dibutanoate, 4-decoxy-1,2-phenylene dibutanoate, 4-phenoxy-1,2-phenylene dibutanoate, 4-chloro-1,2-phenylene diisobutanoate, 4-bromo-1,2-phenylene diisobutanoate, 4-fluro-1,2-phenylene diisobutanoate, 4-iodo-1,2-phenylene diisobutanoate, 4-methyl-1,2-phenylene diisobutanoate, 4-ethyl-1,2-phenylene diisobutanoate, 4-butyl-1,2-phenylene diisobutanoate, 4-isobutyl-1,2-phenylene diisobutanoate, 4-tert-butyl-1,2-phenylene diisobutanoate, 4-isopropyl-1,2-phenylene diisobutanoate, 4-pentyl-1,2-phenylene diisobutanoate, 4-isopentyl-1,2-phenylene diisobutanoate, 4-hexyl-1,2-phenylene diisobutanoate, 4-heptyl-1,2-phenylene diisobutanoate, 4-octyl-1,2-phenylene diisobutanoate, 4-nonyl-1,2-phenylene diisobutanoate, 4-decyl-1,2-phenylene diisobutanoate, 4-dodecyl-1,2-phenylene diisobutanoate, 4-methoxy-1,2-phenylene diisobutanoate, 4-ethoxy-1,2-phenylene diisobutanoate, 4-propoxy-1,2-phenylene diisobutanoate, 4-isopropoxy-1,2-phenylene diisobutanoate, 4-butoxy-1,2-phenylene diisobutanoate, 4-isobutoxy-1,2-phenylene diisobutanoate, 4-tert-butoxy-1,2-phenylene diisobutanoate, 4-pentoxy-1,2-phenylene diisobutanoate, 4-hexoxy-1,2-phenylene diisobutanoate, 4-heptoxy-1,2-phenylene diisobutanoate, 4-octoxy-1,2-phenylene diisobutanoate, 4-nonoxy-1,2-phenylene diisobutanoate, 4-decoxy-1,2-phenylene diisobutanoate, 4-phenoxy-1,2-phenylene diisobutanoate, 4-chloro-1,2-phenylene di-tert-butanoate, 4-bromo-1,2-phenylene di-tert-butanoate, 4-fluro-1,2-phenylene di-tert-butanoate, 4-iodo-1,2-phenylene di-tert-butanoate, 4-methyl-1,2-phenylene di-tert-butanoate, 4-ethyl-1,2-phenylene di-tert-butanoate, 4-butyl-1,2-phenylene di-tert-butanoate, 4-isobutyl-1,2-phenylene di-tert-butanoate, 4-tert-butyl-1,2-phenylene di-tert-butanoate, 4-isopropyl-1,2-phenylene di-tert-butanoate, 4-pentyl-1,2-phenylene di-tert-butanoate, 4-isopentyl-1,2-phenylene di-tert-butanoate, 4-hexyl-1,2-phenylene di-tert-butanoate, 4-heptyl-1,2-phenylene di-tert-butanoate, 4-octyl-1,2-phenylene di-tert-butanoate, 4-nonyl-1,2-phenylene di-tert-butanoate, 4-decyl-1,2-phenylene di-tert-butanoate, 4-dodecyl-1,2-phenylene di-tert-butanoate, 4-methoxy-1,2-phenylene di-tert-butanoate, 4-ethoxy-1,2-phenylene di-tert-butanoate, 4-propoxy-1,2-phenylene di-tert-butanoate, 4-isopropoxy-1,2-phenylene di-tert-butanoate, 4-butoxy-1,2-phenylene di-tert-butanoate, 4-isobutoxy-1,2-phenylene di-tert-butanoate, 4-t-butoxy-1,2-phenylene di-tert-butanoate, 4-pentoxy-1,2-phenylene di-tert-butanoate, 4-hexoxy-1,2-phenylene di-tert-butanoate, 4-heptoxy-1,2-phenylene di-tert-butanoate, 4-octoxy-1,2-phenylene di-tert-butanoate, 4-nonoxy-1,2-phenylene di-tert-butanoate, 4-decoxy-1,2-phenylene di-tert-butanoate, 4-phenoxy-1,2-phenylene di-tert-butanoate, 4-chloro-1,2-phenylene dipentanoate, 4-bromo-1,2-phenylene dipentanoate, 4-fluro-1,2-phenylene dipentanoate, 4-iodo-1,2-phenylene dipentanoate, 4-methyl-1,2-phenylene dipentanoate, 4-ethyl-1,2-phenylene dipentanoate, 4-butyl-1,2-phenylene dipentanoate, 4-isobutyl-1,2-phenylene dipentanoate, 4-tert-butyl-1,2-phenylene dipentanoate, 4-isopropyl-1,2-phenylene dipentanoate, 4-pentyl-1,2-phenylene dipentanoate, 4-isopentyl-1,2-phenylene dipentanoate, 4-hexyl-1,2-phenylene dipentanoate, 4-heptyl-1,2-phenylene dipentanoate, 4-octyl-1,2-phenylene dipentanoate, 4-nonyl-1,2-phenylene dipentanoate, 4-decyl-1,2-phenylene dipentanoate, 4-dodecyl-1,2-phenylene dipentanoate, 4-methoxy-1,2-phenylene dipentanoate, 4-ethoxy-1,2-phenylene dipentanoate, 4-propoxy-1,2-phenylene dipentanoate, 4-isopropoxy-1,2-phenylene dipentanoate, 4-butoxy-1,2-phenylene dipentanoate, 4-isobutoxy-1,2-phenylene dipentanoate, 4-tert-butoxy-1,2-phenylene dipentanoate, 4-pentoxy-1,2-phenylene dipentanoate, 4-hexoxy-1,2-phenylene dipentanoate, 4-heptoxy-1,2-phenylene dipentanoate, 4-octoxy-1,2-phenylene dipentanoate, 4-nonoxy-1,2-phenylene dipentanoate, 4-decoxy-1,2-phenylene dipentanoate, 4-phenoxy-1,2-phenylene dipentanoate, 4-chloro-1,2-phenylene disoipentanoate, 4-bromo-1,2-phenylene disoipentanoate, 4-fluro-1,2-phenylene disoipentanoate, 4-iodo-1,2-phenylene disoipentanoate, 4-methyl-1,2-phenylene disoipentanoate, 4-ethyl-1,2-phenylene disoipentanoate, 4-butyl-1,2-phenylene disoipentanoate, 4-isobutyl-1,2-phenylene disoipentanoate, 4-tert-butyl-1,2-phenylene disoipentanoate, 4-isopropyl-1,2-phenylene disoipentanoate, 4-pentyl-1,2-phenylene disoipentanoate, 4-isopentyl-1,2-phenylene disoipentanoate, 4-hexyl-1,2-phenylene disoipentanoate, 4-heptyl-1,2-phenylene disoipentanoate, 4-octyl-1,2-phenylene disoipentanoate, 4-nonyl-1,2-phenylene disoipentanoate, 4-decyl-1,2-phenylene disoipentanoate, 4-dodecyl-1,2-phenylene disoipentanoate, 4-methoxy-1,2-phenylene disoipentanoate, 4-ethoxy-1,2-phenylene disoipentanoate, 4-propoxy-1,2-phenylene disoipentanoate, 4-isopropoxy-1,2-phenylene disoipentanoate, 4-butoxy-1,2-phenylene disoipentanoate, 4-isobutoxy-1,2-phenylene disoipentanoate, 4-tert-butoxy-1,2-phenylene disoipentanoate, 4-pentoxy-1,2-phenylene disoipentanoate, 4-hexoxy-1,2-phenylene disoipentanoate, 4-heptoxy-1,2-phenylene disoipentanoate, 4-octoxy-1,2-phenylene disoipentanoate, 4-nonoxy-1,2-phenylene disoipentanoate, 4-decoxy-1,2-phenylene disoipentanoate, 4-phenoxy-1,2-phenylene disoipentanoate, 4-chloro-1,2-phenylene dihexanoate, 4-bromo-1,2-phenylene dihexanoate, 4-fluro-1,2-phenylene dihexanoate, 4-iodo-1,2-phenylene dihexanoate, 4-methyl-1,2-phenylene dihexanoate, 4-ethyl-1,2-phenylene dihexanoate, 4-butyl-1,2-phenylene dihexanoate, 4-isobutyl-1,2-phenylene dihexanoate, 4-tert-butyl-1,2-phenylene dihexanoate, 4-isopropyl-1,2-phenylene dihexanoate, 4-pentyl-1,2-phenylene dihexanoate, 4-isopentyl-1,2-phenylene dihexanoate, 4-hexyl-1,2-phenylene dihexanoate, 4-heptyl-1,2-phenylene dihexanoate, 4-octyl-1,2-phenylene dihexanoate, 4-nonyl-1,2-phenylene dihexanoate, 4-decyl-1,2-phenylene dihexanoate, 4-dodecyl-1,2-phenylene dihexanoate, 4-methoxy-1,2-phenylene dihexanoate, 4-ethoxy-1,2-phenylene dihexanoate, 4-propoxy-1,2-phenylene dihexanoate, 4-isopropoxy-1,2-phenylene dihexanoate, 4-butoxy-1,2-phenylene dihexanoate, 4-isobutoxy-1,2-phenylene dihexanoate, 4-tert-butoxy-1,2-phenylene dihexanoate, 4-pentoxy-1,2-phenylene dihexanoate, 4-hexoxy-1,2-phenylene dihexanoate, 4-heptoxy-1,2-phenylene dihexanoate, 4-octoxy-1,2-phenylene dihexanoate, 4-nonoxy-1,2-phenylene dihexanoate, 4-decoxy-1,2-phenylene dihexanoate, 4-phenoxy-1,2-phenylene dihexanoate, 4-chloro-1,2-phenylene diisohexanoate, 4-bromo-1,2-phenylene diisohexanoate, 4-fluro-1,2-phenylene diisohexanoate, 4-iodo-1,2-phenylene diisohexanoate, 4-methyl-1,2-phenylene diisohexanoate, 4-ethyl-1,2-phenylene diisohexanoate, 4-butyl-1,2-phenylene diisohexanoate, 4-isobutyl-1,2-phenylene diisohexanoate, 4-tert-butyl-1,2-phenylene diisohexanoate, 4-isopropyl-1,2-phenylene diisohexanoate, 4-pentyl-1,2-phenylene diisohexanoate, 4-isopentyl-1,2-phenylene diisohexanoate, 4-hexyl-1,2-phenylene diisohexanoate, 4-heptyl-1,2-phenylene diisohexanoate, 4-octyl-1,2-phenylene diisohexanoate, 4-nonyl-1,2-phenylene diisohexanoate, 4-decyl-1,2-phenylene diisohexanoate, 4-dodecyl-1,2-phenylene diisohexanoate, 4-methoxy-1,2-phenylene diisohexanoate, 4-ethoxy-1,2-phenylene diisohexanoate, 4-propoxy-1,2-phenylene diisohexanoate, 4-isopropoxy-1,2-phenylene diisohexanoate, 4-butoxy-1,2-phenylene diisohexanoate, 4-isobutoxy-1,2-phenylene diisohexanoate, 4-tert-butoxy-1,2-phenylene diisohexanoate, 4-pentoxy-1,2-phenylene diisohexanoate, 4-hexoxy-1,2-phenylene diisohexanoate, 4-heptoxy-1,2-phenylene diisohexanoate, 4-octoxy-1,2-phenylene diisohexanoate, 4-nonoxy-1,2-phenylene diisohexanoate, 4-decoxy-1,2-phenylene diisohexanoate, 4-phenoxy-1,2-phenylene diisohexanoate, 4-chloro-1,2-phenylene diheptanoate, 4-bromo-1,2-phenylene diheptanoate, 4-fluro-1,2-phenylene diheptanoate, 4-iodo-1,2-phenylene diheptanoate, 4-methyl-1,2-phenylene diheptanoate, 4-ethyl-1,2-phenylene diheptanoate, 4-butyl-1,2-phenylene diheptanoate, 4-isobutyl-1,2-phenylene diheptanoate, 4-tert-butyl-1,2-phenylene diheptanoate, 4-isopropyl-1,2-phenylene diheptanoate, 4-pentyl-1,2-phenylene diheptanoate, 4-isopentyl-1,2-phenylene diheptanoate, 4-hexyl-1,2-phenylene diheptanoate, 4-heptyl-1,2-phenylene diheptanoate, 4-octyl-1,2-phenylene diheptanoate, 4-nonyl-1,2-phenylene diheptanoate, 4-decyl-1,2-phenylene diheptanoate, 4-dodecyl-1,2-phenylene diheptanoate, 4-methoxy-1,2-phenylene diheptanoate, 4-ethoxy-1,2-phenylene diheptanoate, 4-propoxy-1,2-phenylene diheptanoate, 4-isopropoxy-1,2-phenylene diheptanoate, 4-butoxy-1,2-phenylene diheptanoate, 4-isobutoxy-1,2-phenylene diheptanoate, 4-tert-butoxy-1,2-phenylene diheptanoate, 4-pentoxy-1,2-phenylene diheptanoate, 4-hexoxy-1,2-phenylene diheptanoate, 4-heptoxy-1,2-phenylene diheptanoate, 4-octoxy-1,2-phenylene diheptanoate, 4-nonoxy-1,2-phenylene diheptanoate, 4-decoxy-1,2-phenylene diheptanoate, 4-phenoxy-1,2-phenylene diheptanoate, 4-chloro-1,2-phenylene diisoheptanoate, 4-bromo-1,2-phenylene diisoheptanoate, 4-fluro-1,2-phenylene diisoheptanoate, 4-iodo-1,2-phenylene diisoheptanoate, 4-methyl-1,2-phenylene diisoheptanoate, 4-ethyl-1,2-phenylene diisoheptanoate, 4-butyl-1,2-phenylene diisoheptanoate, 4-isobutyl-1,2-phenylene diisoheptanoate, 4-tert-butyl-1,2-phenylene diisoheptanoate, 4-isopropyl-1,2-phenylene diisoheptanoate, 4-pentyl-1,2-phenylene diisoheptanoate, 4-isopentyl-1,2-phenylene diisoheptanoate, 4-hexyl-1,2-phenylene diisoheptanoate, 4-heptyl-1,2-phenylene diisoheptanoate, 4-octyl-1,2-phenylene diisoheptanoate, 4-nonyl-1,2-phenylene diisoheptanoate, 4-decyl-1,2-phenylene diisoheptanoate, 4-dodecyl-1,2-phenylene diisoheptanoate, 4-methoxy-1,2-phenylene diisoheptanoate, 4-ethoxy-1,2-phenylene diisoheptanoate, 4-propoxy-1,2-phenylene diisoheptanoate, 4-isopropoxy-1,2-phenylene diisoheptanoate, 4-butoxy-1,2-phenylene diisoheptanoate, 4-isobutoxy-1,2-phenylene diisoheptanoate, 4-tert-butoxy-1,2-phenylene diisoheptanoate, 4-pentoxy-1,2-phenylene diisoheptanoate, 4-hexoxy-1,2-phenylene diisoheptanoate, 4-heptoxy-1,2-phenylene diisoheptanoate, 4-octoxy-1,2-phenylene diisoheptanoate, 4-nonoxy-1,2-phenylene diisoheptanoate, 4-decoxy-1,2-phenylene diisoheptanoate, 4-phenoxy-1,2-phenylene diisoheptanoate, 4-chloro-1,2-phenylene dioctanoate, 4-bromo-1,2-phenylene dioctanoate, 4-fluro-1,2-phenylene dioctanoate, 4-iodo-1,2-phenylene dioctanoate, 4-methyl-1,2-phenylene dioctanoate, 4-ethyl-1,2-phenylene dioctanoate, 4-butyl-1,2-phenylene dioctanoate, 4-isobutyl-1,2-phenylene dioctanoate, 4-tert-butyl-1,2-phenylene dioctanoate, 4-isopropyl-1,2-phenylene dioctanoate, 4-pentyl-1,2-phenylene dioctanoate, 4-isopentyl-1,2-phenylene dioctanoate, 4-hexyl-1,2-phenylene dioctanoate, 4-heptyl-1,2-phenylene dioctanoate, 4-octyl-1,2-phenylene dioctanoate, 4-nonyl-1,2-phenylene dioctanoate, 4-decyl-1,2-phenylene dioctanoate, 4-dodecyl-1,2-phenylene dioctanoate, 4-methoxy-1,2-phenylene dioctanoate, 4-ethoxy-1,2-phenylene dioctanoate, 4-propoxy-1,2-phenylene dioctanoate, 4-isopropoxy-1,2-phenylene dioctanoate, 4-butoxy-1,2-phenylene dioctanoate, 4-isobutoxy-1,2-phenylene dioctanoate, 4-tert-butoxy-1,2-phenylene dioctanoate, 4-pentoxy-1,2-phenylene dioctanoate, 4-hexoxy-1,2-phenylene dioctanoate, 4-heptoxy-1,2-phenylene dioctanoate, 4-octoxy-1,2-phenylene dioctanoate, 4-nonoxy-1,2-phenylene dioctanoate, 4-decoxy-1,2-phenylene dioctanoate, 4-phenoxy-1,2-phenylene dioctanoate, 4-chloro-1,2-phenylene diisooctanoate, 4-bromo-1,2-phenylene diisooctanoate, 4-fluro-1,2-phenylene diisooctanoate, 4-iodo-1,2-phenylene diisooctanoate, 4-methyl-1,2-phenylene diisooctanoate, 4-ethyl-1,2-phenylene diisooctanoate, 4-butyl-1,2-phenylene diisooctanoate, 4-isobutyl-1,2-phenylene diisooctanoate, 4-tert-butyl-1,2-phenylene diisooctanoate, 4-isopropyl-1,2-phenylene diisooctanoate, 4-pentyl-1,2-phenylene diisooctanoate, 4-isopentyl-1,2-phenylene diisooctanoate, 4-hexyl-1,2-phenylene diisooctanoate, 4-heptyl-1,2-phenylene diisooctanoate, 4-octyl-1,2-phenylene diisooctanoate, 4-nonyl-1,2-phenylene diisooctanoate, 4-decyl-1,2-phenylene diisooctanoate, 4-dodecyl-1,2-phenylene diisooctanoate, 4-methoxy-1,2-phenylene diisooctanoate, 4-ethoxy-1,2-phenylene diisooctanoate, 4-propoxy-1,2-phenylene diisooctanoate, 4-isopropoxy-1,2-phenylene diisooctanoate, 4-butoxy-1,2-phenylene diisooctanoate, 4-isobutoxy-1,2-phenylene diisooctanoate, 4-tert-butoxy-1,2-phenylene diisooctanoate, 4-pentoxy-1,2-phenylene diisooctanoate, 4-hexoxy-1,2-phenylene diisooctanoate, 4-heptoxy-1,2-phenylene diisooctanoate, 4-octoxy-1,2-phenylene diisooctanoate, 4-nonoxy-1,2-phenylene diisooctanoate, 4-decoxy-1,2-phenylene diisooctanoate, 4-phenoxy-1,2-phenylene diisooctanoate, 4-chloro-1,2-phenylene dinonanoate, 4-bromo-1,2-phenylene dinonanoate, 4-fluro-1,2-phenylene dinonanoate, 4-iodo-1,2-phenylene dinonanoate, 4-methyl-1,2-phenylene dinonanoate, 4-ethyl-1,2-phenylene dinonanoate, 4-butyl-1,2-phenylene dinonanoate, 4-isobutyl-1,2-phenylene dinonanoate, 4-tert-butyl-1,2-phenylene dinonanoate, 4-isopropyl-1,2-phenylene dinonanoate, 4-pentyl-1,2-phenylene dinonanoate, 4-isopentyl-1,2-phenylene dinonanoate, 4-hexyl-1,2-phenylene dinonanoate, 4-heptyl-1,2-phenylene dinonanoate, 4-octyl-1,2-phenylene dinonanoate, 4-nonyl-1,2-phenylene dinonanoate, 4-decyl-1,2-phenylene dinonanoate, 4-dodecyl-1,2-phenylene dinonanoate, 4-methoxy-1,2-phenylene dinonanoate, 4-ethoxy-1,2-phenylene dinonanoate, 4-propoxy-1,2-phenylene dinonanoate, 4-isopropoxy-1,2-phenylene dinonanoate, 4-butoxy-1,2-phenylene dinonanoate, 4-isobutoxy-1,2-phenylene dinonanoate, 4-tert-butoxy-1,2-phenylene dinonanoate, 4-pentoxy-1,2-phenylene dinonanoate, 4-hexoxy-1,2-phenylene dinonanoate, 4-heptoxy-1,2-phenylene dinonanoate, 4-octoxy-1,2-phenylene dinonanoate, 4-nonoxy-1,2-phenylene dinonanoate, 4-decoxy-1,2-phenylene dinonanoate, 4-phenoxy-1,2-phenylene dinonanoate, 4-chloro-1,2-phenylene didecanoate, 4-bromo-1,2-phenylene didecanoate, 4-fluro-1,2-phenylene didecanoate, 4-iodo-1,2-phenylene didecanoate, 4-methyl-1,2-phenylene didecanoate, 4-ethyl-1,2-phenylene didecanoate, 4-butyl-1,2-phenylene didecanoate, 4-isobutyl-1,2-phenylene didecanoate, 4-tert-butyl-1,2-phenylene didecanoate, 4-isopropyl-1,2-phenylene didecanoate, 4-pentyl-1,2-phenylene didecanoate, 4-isopentyl-1,2-phenylene didecanoate, 4-hexyl-1,2-phenylene didecanoate, 4-heptyl-1,2-phenylene didecanoate, 4-octyl-1,2-phenylene didecanoate, 4-nonyl-1,2-phenylene didecanoate, 4-decyl-1,2-phenylene didecanoate, 4-dodecyl-1,2-phenylene didecanoate, 4-methoxy-1,2-phenylene didecanoate, 4-ethoxy-1,2-phenylene didecanoate, 4-propoxy-1,2-phenylene didecanoate, 4-isopropoxy-1,2-phenylene didecanoate, 4-butoxy-1,2-phenylene didecanoate, 4-isobutoxy-1,2-phenylene didecanoate, 4-tert-butoxy-1,2-phenylene didecanoate, 4-pentoxy-1,2-phenylene didecanoate, 4-hexoxy-1,2-phenylene didecanoate, 4-heptoxy-1,2-phenylene didecanoate, 4-octoxy-1,2-phenylene didecanoate, 4-nonoxy-1,2-phenylene didecanoate, 4-decoxy-1,2-phenylene didecanoate, 4-phenoxy-1,2-phenylene didecanoate, 4-(tert-butyl)-1,2-phenylene bis(2-methylpropanoate), 4-(tert-butyl)-1,2-phenylene bis(2,2-dimethylpropanoate), 4-(tert-butyl)-1,2-phenylene bis(3-methylbutanoate), 4-(tert-butyl)-1,2-phenylene bis(2-ethylhexanoate), 4-(tert-butyl)-1,2-phenylene bis(3,3-dimethylbutanoate), 3-chloro-1,2-phenylene diacetate, 3-bromo-1,2-phenylene diacetate, 3-fluro-1,2-phenylene diacetate, 3-iodo-1,2-phenylene diacetate, 3-methyl-1,2-phenylene diacetate, 3-ethyl-1,2-phenylene diacetate, 3-butyl-1,2-phenylene diacetate, 3-isobutyl-1,2-phenylene diacetate, 3-tert-butyl-1,2-phenylene diacetate, 3-isopropyl-1,2-phenylene diacetate, 3-pentyl-1,2-phenylene diacetate, 3-isopentyl-1,2-phenylene diacetate, 3-hexyl-1,2-phenylene diacetate, 3-heptyl-1,2-phenylene diacetate, 3-octyl-1,2-phenylene diacetate, 3-nonyl-1,2-phenylene diacetate, 3-decyl-1,2-phenylene diacetate, 3-dodecyl-1,2-phenylene diacetate, 3-methoxy-1,2-phenylene diacetate, 3-ethoxy-1,2-phenylene diacetate, 3-propoxy-1,2-phenylene diacetate, 3-isopropoxy-1,2-phenylene diacetate, 3-butoxy-1,2-phenylene diacetate, 3-isobutoxy-1,2-phenylene diacetate, 3-tert-butoxy-1,2-phenylene diacetate, 3-pentoxy-1,2-phenylene diacetate, 3-hexoxy-1,2-phenylene diacetate, 3-heptoxy-1,2-phenylene diacetate, 3-octoxy-1,2-phenylene diacetate, 3-nonoxy-1,2-phenylene diacetate, 3-decoxy-1,2-phenylene diacetate, 3-phenoxy-1,2-phenylene diacetate, 3-chloro-1,2-phenylene diisopropanoate, 3-bromo-1,2-phenylene diisopropanoate, 3-fluro-1,2-phenylene diisopropanoate, 3-iodo-1,2-phenylene diisopropanoate, 3-methyl-1,2-phenylene diisopropanoate, 3-ethyl-1,2-phenylene diisopropanoate, 3-butyl-1,2-phenylene diisopropanoate, 3-isobutyl-1,2-phenylene diisopropanoate, 3-tert-butyl-1,2-phenylene diisopropanoate, 3-isopropyl-1,2-phenylene diisopropanoate, 3-pentyl-1,2-phenylene diisopropanoate, 3-isopentyl-1,2-phenylene diisopropanoate 3-hexyl-1,2-phenylene diisopropanoate, 3-heptyl-1,2-phenylene diisopropanoate, 3-octyl-1,2-phenylene diisopropanoate, 3-nonyl-1,2-phenylene diisopropanoate, 3-decyl-1,2-phenylene diisopropanoate, 3-dodecyl-1,2-phenylene diisopropanoate, 3-methoxy-1,2-phenylene diisopropanoate 3-ethoxy-1,2-phenylene diisopropanoate, 3-propoxy-1,2-phenylene diisopropanoate, 3-isopropoxy-1,2-phenylene diisopropanoate, 3-butoxy-1,2-phenylene diisopropanoate, 3-isobutoxy-1,2-phenylene diisopropanoate, 3-tert-butoxy-1,2-phenylene dipropaonate, 3-pentoxy-1,2-phenylene diisopropanoate, 3-hexoxy-1,2-phenylene diisopropanoate, 3-heptoxy-1,2-phenylene diisopropanoate, 3-octoxy-1,2-phenylene diisopropanoate, 3-nonoxy-1,2-phenylene diisopropanoate, 3-decoxy-1,2-phenylene diisopropanoate, 3-phenoxy-1,2-phenylene diisopropanoate, 3-chloro-1,2-phenylene diisopropanoate, 3-bromo-1,2-phenylene diisopropanoate, 3-fluro-1,2-phenylene diisopropanoate, 3-iodo-1,2-phenylene diisopropanoate, 3-methyl-1,2-phenylene diisopropanoate, 3-ethyl-1,2-phenylene diisopropanoate, 3-butyl-1,2-phenylene diisopropanoate, 3-isobutyl-1,2-phenylene diisopropanoate, 3-tert-butyl-1,2-phenylene diisopropanoate, 3-isopropyl-1,2-phenylene diisopropanoate, 3-pentyl-1,2-phenylene diisopropanoate, 3-isopentyl-1,2-phenylene diisopropanoate, 3-hexyl-1,2-phenylene diisopropanoate, 3-heptyl-1,2-phenylene diisopropanoate, 3-octyl-1,2-phenylene diisopropanoate, 3-nonyl-1,2-phenylene diisopropanoate, 3-decyl-1,2-phenylene diisopropanoate, 3-dodecyl-1,2-phenylene diisopropanoate, 3-methoxy-1,2-phenylene diisopropanoate, 3-ethoxy-1,2-phenylene diisopropanoate, 3-propoxy-1,2-phenylene diisopropanoate, 3-isopropoxy-1,2-phenylene diisopropanoate, 3-butoxy-1,2-phenylene diisopropanoate, 3-isobutoxy-1,2-phenylene diisopropanoate, 3-tert-butoxy-1,2-phenylene diisopropanoate, 3-pentoxy-1,2-phenylene diisopropanoate, 3-hexoxy-1,2-phenylene diisopropanoate, 3-heptoxy-1,2-phenylene diisopropanoate, 3-octoxy-1,2-phenylene diisopropanoate, 3-nonoxy-1,2-phenylene diisopropanoate, 3-decoxy-1,2-phenylene diisopropanoate, 3-phenoxy-1,2-phenylene diisopropanoate, 3-chloro-1,2-phenylene dibutanoate, 3-bromo-1,2-phenylene dibutanoate, 3-fluro-1,2-phenylene dibutanoate, 3-iodo-1,2-phenylene dibutanoate, 3-methyl-1,2-phenylene dibutanoate, 3-ethyl-1,2-phenylene dibutanoate, 3-butyl-1,2-phenylene dibutanoate, 3-isobutyl-1,2-phenylene dibutanoate, 3-tert-butyl-1,2-phenylene dibutanoate, 3-isopropyl-1,2-phenylene dibutanoate, 3-pentyl-1,2-phenylene dibutanoate, 3-isopentyl-1,2-phenylene dibutanoate, 3-hexyl-1,2-phenylene dibutanoate, 3-heptyl-1,2-phenylene dibutanoate, 3-octyl-1,2-phenylene dibutanoate, 3-nonyl-1,2-phenylene dibutanoate, 3-decyl-1,2-phenylene dibutanoate, 3-dodecyl-1,2-phenylene dibutanoate, 3-methoxy-1,2-phenylene dibutanoate, 3-ethoxy-1,2-phenylene dibutanoate, 3-propoxy-1,2-phenylene dibutanoate, 3-isopropoxy-1,2-phenylene dibutanoate, 3-butoxy-1,2-phenylene dibutanoate, 3-isobutoxy-1,2-phenylene dibutanoate, 3-tert-butoxy-1,2-phenylene dibutanoate, 3-pentoxy-1,2-phenylene dibutanoate, 3-hexoxy-1,2-phenylene dibutanoate, 3-heptoxy-1,2-phenylene dibutanoate, 3-octoxy-1,2-phenylene dibutanoate, 3-nonoxy-1,2-phenylene dibutanoate, 3-decoxy-1,2-phenylene dibutanoate, 3-phenoxy-1,2-phenylene dibutanoate, 3-chloro-1,2-phenylene diisobutanoate, 3-bromo-1,2-phenylene diisobutanoate, 3-fluro-1,2-phenylene diisobutanoate, 3-iodo-1,2-phenylene diisobutanoate, 3-methyl-1,2-phenylene diisobutanoate, 3-ethyl-1,2-phenylene diisobutanoate, 3-butyl-1,2-phenylene diisobutanoate, 3-isobutyl-1,2-phenylene diisobutanoate, 3-tert-butyl-1,2-phenylene diisobutanoate, 3-isopropyl-1,2-phenylene diisobutanoate, 3-pentyl-1,2-phenylene diisobutanoate, 3-isopentyl-1,2-phenylene diisobutanoate, 3-hexyl-1,2-phenylene diisobutanoate, 3-heptyl-1,2-phenylene diisobutanoate, 3-octyl-1,2-phenylene diisobutanoate, 3-nonyl-1,2-phenylene diisobutanoate, 3-decyl-1,2-phenylene diisobutanoate, 3-dodecyl-1,2-phenylene diisobutanoate, 3-methoxy-1,2-phenylene diisobutanoate, 3-ethoxy-1,2-phenylene diisobutanoate, 3-propoxy-1,2-phenylene diisobutanoate, 3-isopropoxy-1,2-phenylene diisobutanoate, 3-butoxy-1,2-phenylene diisobutanoate, 3-isobutoxy-1,2-phenylene diisobutanoate, 3-tert-butoxy-1,2-phenylene diisobutanoate, 3-pentoxy-1,2-phenylene diisobutanoate, 3-hexoxy-1,2-phenylene diisobutanoate, 3-heptoxy-1,2-phenylene diisobutanoate, 3-octoxy-1,2-phenylene diisobutanoate, 3-nonoxy-1,2-phenylene diisobutanoate, 3-decoxy-1,2-phenylene diisobutanoate, 3-phenoxy-1,2-phenylene diisobutanoate, 3-chloro-1,2-phenylene di-tert-butanoate, 3-bromo-1,2-phenylene di-tert-butanoate, 3-fluro-1,2-phenylene di-tert-butanoate, 3-iodo-1,2-phenylene di-tert-butanoate, 3-methyl-1,2-phenylene di-tert-butanoate, 3-ethyl-1,2-phenylene di-tert-butanoate, 3-butyl-1,2-phenylene di-tert-butanoate, 3-isobutyl-1,2-phenylene di-tert-butanoate, 3-tert-butyl-1,2-phenylene di-tert-butanoate, 3-isopropyl-1,2-phenylene di-tert-butanoate, 3-pentyl-1,2-phenylene di-tert-butanoate, 3-isopentyl-1,2-phenylene di-tert-butanoate, 3-hexyl-1,2-phenylene di-tert-butanoate, 3-heptyl-1,2-phenylene di-tert-butanoate, 3-octyl-1,2-phenylene di-tert-butanoate, 3-nonyl-1,2-phenylene di-tert-butanoate, 3-decyl-1,2-phenylene di-tert-butanoate, 3-dodecyl-1,2-phenylene di-tert-butanoate, 3-methoxy-1,2-phenylene di-tert-butanoate, 3-ethoxy-1,2-phenylene di-tert-butanoate, 3-propoxy-1,2-phenylene di-tert-butanoate, 3-isopropoxy-1,2-phenylene di-tert-butanoate, 3-butoxy-1,2-phenylene di-tert-butanoate, 3-isobutoxy-1,2-phenylene di-tert-butanoate, 3-t-butoxy-1,2-phenylene di-tert-butanoate, 3-pentoxy-1,2-phenylene di-tert-butanoate, 3-hexoxy-1,2-phenylene di-tert-butanoate, 3-heptoxy-1,2-phenylene di-tert-butanoate, 3-octoxy-1,2-phenylene di-tert-butanoate, 3-nonoxy-1,2-phenylene di-tert-butanoate, 3-decoxy-1,2-phenylene di-tert-butanoate, 3-phenoxy-1,2-phenylene di-tert-butanoate, 3-chloro-1,2-phenylene dipentanoate, 3-bromo-1,2-phenylene dipentanoate, 3-fluro-1,2-phenylene dipentanoate, 3-iodo-1,2-phenylene dipentanoate, 3-methyl-1,2-phenylene dipentanoate, 3-ethyl-1,2-phenylene dipentanoate, 3-butyl-1,2-phenylene dipentanoate, 3-isobutyl-1,2-phenylene dipentanoate, 3-tert-butyl-1,2-phenylene dipentanoate, 3-isopropyl-1,2-phenylene dipentanoate, 3-pentyl-1,2-phenylene dipentanoate, 3-isopentyl-1,2-phenylene dipentanoate, 3-hexyl-1,2-phenylene dipentanoate, 3-heptyl-1,2-phenylene dipentanoate, 3-octyl-1,2-phenylene dipentanoate, 3-nonyl-1,2-phenylene dipentanoate, 3-decyl-1,2-phenylene dipentanoate, 3-dodecyl-1,2-phenylene dipentanoate, 3-methoxy-1,2-phenylene dipentanoate, 3-ethoxy-1,2-phenylene dipentanoate, 3-propoxy-1,2-phenylene dipentanoate, 3-isopropoxy-1,2-phenylene dipentanoate, 3-butoxy-1,2-phenylene dipentanoate, 3-isobutoxy-1,2-phenylene dipentanoate, 3-tert-butoxy-1,2-phenylene dipentanoate, 3-pentoxy-1,2-phenylene dipentanoate, 3-hexoxy-1,2-phenylene dipentanoate, 3-heptoxy-1,2-phenylene dipentanoate, 3-octoxy-1,2-phenylene dipentanoate, 3-nonoxy-1,2-phenylene dipentanoate, 3-decoxy-1,2-phenylene dipentanoate, 3-phenoxy-1,2-phenylene dipentanoate, 3-chloro-1,2-phenylene diisopentanoate, 3-bromo-1,2-phenylene diisoipentanoate, 3-fluro-1,2-phenylene diisoipentanoate, 3-iodo-1,2-phenylene diisoipentanoate, 3-methyl-1,2-phenylene diisoipentanoate, 3-ethyl-1,2-phenylene diisoipentanoate, 3-butyl-1,2-phenylene diisoipentanoate, 3-isobutyl-1,2-phenylene diisoipentanoate, 3-tert-butyl-1,2-phenylene diisoipentanoate, 3-isopropyl-1,2-phenylene diisoipentanoate, 3-pentyl-1,2-phenylene diisoipentanoate, 3-isopentyl-1,2-phenylene diisoipentanoate, 3-hexyl-1,2-phenylene diisoipentanoate, 3-heptyl-1,2-phenylene diisoipentanoate, 3-octyl-1,2-phenylene diisoipentanoate, 3-nonyl-1,2-phenylene diisoipentanoate, 3-decyl-1,2-phenylene diisoipentanoate, 3-dodecyl-1,2-phenylene diisoipentanoate, 3-methoxy-1,2-phenylene diisoipentanoate, 3-ethoxy-1,2-phenylene diisoipentanoate, 3-propoxy-1,2-phenylene diisoipentanoate, 3-isopropoxy-1,2-phenylene diisoipentanoate, 3-butoxy-1,2-phenylene diisoipentanoate, 3-isobutoxy-1,2-phenylene diisoipentanoate, 3-tert-butoxy-1,2-phenylene diisoipentanoate, 3-pentoxy-1,2-phenylene diisoipentanoate, 3-hexoxy-1,2-phenylene diisoipentanoate, 3-heptoxy-1,2-phenylene diisoipentanoate, 3-octoxy-1,2-phenylene diisoipentanoate, 3-nonoxy-1,2-phenylene diisoipentanoate, 3-decoxy-1,2-phenylene diisoipentanoate, 3-phenoxy-1,2-phenylene diisoipentanoate, 3-chloro-1,2-phenylene dihexanoate, 3-bromo-1,2-phenylene dihexanoate, 3-fluro-1,2-phenylene dihexanoate, 3-iodo-1,2-phenylene dihexanoate, 3-methyl-1,2-phenylene dihexanoate, 3-ethyl-1,2-phenylene dihexanoate, 3-butyl-1,2-phenylene dihexanoate, 3-isobutyl-1,2-phenylene dihexanoate, 3-tert-butyl-1,2-phenylene dihexanoate, 3-isopropyl-1,2-phenylene dihexanoate, 3-pentyl-1,2-phenylene dihexanoate, 3-isopentyl-1,2-phenylene dihexanoate, 3-hexyl-1,2-phenylene dihexanoate, 3-heptyl-1,2-phenylene dihexanoate, 3-octyl-1,2-phenylene dihexanoate, 3-nonyl-1,2-phenylene dihexanoate, 3-decyl-1,2-phenylene dihexanoate, 3-dodecyl-1,2-phenylene dihexanoate, 3-methoxy-1,2-phenylene dihexanoate, 3-ethoxy-1,2-phenylene dihexanoate, 3-propoxy-1,2-phenylene dihexanoate, 3-isopropoxy-1,2-phenylene dihexanoate, 3-butoxy-1,2-phenylene dihexanoate, 3-isobutoxy-1,2-phenylene dihexanoate, 3-tert-butoxy-1,2-phenylene dihexanoate, 3-pentoxy-1,2-phenylene dihexanoate, 3-hexoxy-1,2-phenylene dihexanoate, 3-heptoxy-1,2-phenylene dihexanoate, 3-octoxy-1,2-phenylene dihexanoate, 3-nonoxy-1,2-phenylene dihexanoate, 3-decoxy-1,2-phenylene dihexanoate, 3-phenoxy-1,2-phenylene dihexanoate, 3-chloro-1,2-phenylene diisohexanoate, 3-bromo-1,2-phenylene diisohexanoate, 3-fluro-1,2-phenylene diisohexanoate, 3-iodo-1,2-phenylene diisohexanoate, 3-methyl-1,2-phenylene diisohexanoate, 3-ethyl-1,2-phenylene diisohexanoate, 3-butyl-1,2-phenylene diisohexanoate, 3-isobutyl-1,2-phenylene diisohexanoate, 3-tert-butyl-1,2-phenylene diisohexanoate, 3-isopropyl-1,2-phenylene diisohexanoate, 3-pentyl-1,2-phenylene diisohexanoate, 3-isopentyl-1,2-phenylene diisohexanoate, 3-hexyl-1,2-phenylene diisohexanoate, 3-heptyl-1,2-phenylene diisohexanoate, 3-octyl-1,2-phenylene diisohexanoate, 3-nonyl-1,2-phenylene diisohexanoate, 3-decyl-1,2-phenylene diisohexanoate, 3-dodecyl-1,2-phenylene diisohexanoate, 3-methoxy-1,2-phenylene diisohexanoate, 3-ethoxy-1,2-phenylene diisohexanoate, 3-propoxy-1,2-phenylene diisohexanoate, 3-isopropoxy-1,2-phenylene diisohexanoate, 3-butoxy-1,2-phenylene diisohexanoate, 3-isobutoxy-1,2-phenylene diisohexanoate, 3-tert-butoxy-1,2-phenylene diisohexanoate, 3-pentoxy-1,2-phenylene diisohexanoate, 3-hexoxy-1,2-phenylene diisohexanoate, 3-heptoxy-1,2-phenylene diisohexanoate, 3-octoxy-1,2-phenylene diisohexanoate, 3-nonoxy-1,2-phenylene diisohexanoate, 3-decoxy-1,2-phenylene diisohexanoate, 3-phenoxy-1,2-phenylene diisohexanoate, 3-chloro-1,2-phenylene diheptanoate, 3-bromo-1,2-phenylene diheptanoate, 3-fluro-1,2-phenylene diheptanoate, 3-iodo-1,2-phenylene diheptanoate, 3-methyl-1,2-phenylene diheptanoate, 3-ethyl-1,2-phenylene diheptanoate, 3-butyl-1,2-phenylene diheptanoate, 3-isobutyl-1,2-phenylene diheptanoate, 3-tert-butyl-1,2-phenylene diheptanoate, 3-isopropyl-1,2-phenylene diheptanoate, 3-pentyl-1,2-phenylene diheptanoate, 3-isopentyl-1,2-phenylene diheptanoate, 3-hexyl-1,2-phenylene diheptanoate, 3-heptyl-1,2-phenylene diheptanoate, 3-octyl-1,2-phenylene diheptanoate, 3-nonyl-1,2-phenylene diheptanoate, 3-decyl-1,2-phenylene diheptanoate, 3-dodecyl-1,2-phenylene diheptanoate, 3-methoxy-1,2-phenylene diheptanoate, 3-ethoxy-1,2-phenylene diheptanoate, 3-propoxy-1,2-phenylene diheptanoate, 3-isopropoxy-1,2-phenylene diheptanoate, 3-butoxy-1,2-phenylene diheptanoate, 3-isobutoxy-1,2-phenylene diheptanoate, 3-tert-butoxy-1,2-phenylene diheptanoate, 3-pentoxy-1,2-phenylene diheptanoate, 3-hexoxy-1,2-phenylene diheptanoate, 3-heptoxy-1,2-phenylene diheptanoate, 3-octoxy-1,2-phenylene diheptanoate, 3-nonoxy-1,2-phenylene diheptanoate, 3-decoxy-1,2-phenylene diheptanoate, 3-phenoxy-1,2-phenylene diheptanoate, 3-chloro-1,2-phenylene diisoheptanoate, 3-bromo-1,2-phenylene diisoheptanoate, 3-fluro-1,2-phenylene diisoheptanoate, 3-iodo-1,2-phenylene diisoheptanoate, 3-methyl-1,2-phenylene diisoheptanoate, 3-ethyl-1,2-phenylene diisoheptanoate, 3-butyl-1,2-phenylene diisoheptanoate, 3-isobutyl-1,2-phenylene diisoheptanoate, 3-tert-butyl-1,2-phenylene diisoheptanoate, 3-isopropyl-1,2-phenylene diisoheptanoate, 3-pentyl-1,2-phenylene diisoheptanoate, 3-isopentyl-1,2-phenylene diisoheptanoate, 3-hexyl-1,2-phenylene diisoheptanoate, 3-heptyl-1,2-phenylene diisoheptanoate, 3-octyl-1,2-phenylene diisoheptanoate, 3-nonyl-1,2-phenylene diisoheptanoate, 3-decyl-1,2-phenylene diisoheptanoate, 3-dodecyl-1,2-phenylene diisoheptanoate, 3-methoxy-1,2-phenylene diisoheptanoate, 3-ethoxy-1,2-phenylene diisoheptanoate, 3-propoxy-1,2-phenylene diisoheptanoate, 3-isopropoxy-1,2-phenylene diisoheptanoate, 3-butoxy-1,2-phenylene diisoheptanoate, 3-isobutoxy-1,2-phenylene diisoheptanoate, 3-tert-butoxy-1,2-phenylene diisoheptanoate, 3-pentoxy-1,2-phenylene diisoheptanoate, 3-hexoxy-1,2-phenylene diisoheptanoate, 3-heptoxy-1,2-phenylene diisoheptanoate, 3-octoxy-1,2-phenylene diisoheptanoate, 3-nonoxy-1,2-phenylene diisoheptanoate, 3-decoxy-1,2-phenylene diisoheptanoate, 3-phenoxy-1,2-phenylene diisoheptanoate, 3-chloro-1,2-phenylene dioctanoate, 3-bromo-1,2-phenylene dioctanoate, 3-fluro-1,2-phenylene dioctanoate, 3-iodo-1,2-phenylene dioctanoate, 3-methyl-1,2-phenylene dioctanoate, 3-ethyl-1,2-phenylene dioctanoate, 3-butyl-1,2-phenylene dioctanoate, 3-isobutyl-1,2-phenylene dioctanoate, 3-tert-butyl-1,2-phenylene dioctanoate, 3-isopropyl-1,2-phenylene dioctanoate, 3-pentyl-1,2-phenylene dioctanoate, 3-isopentyl-1,2-phenylene dioctanoate, 3-hexyl-1,2-phenylene dioctanoate, 3-heptyl-1,2-phenylene dioctanoate, 3-octyl-1,2-phenylene dioctanoate, 3-nonyl-1,2-phenylene dioctanoate, 3-decyl-1,2-phenylene dioctanoate, 3-dodecyl-1,2-phenylene dioctanoate, 3-methoxy-1,2-phenylene dioctanoate, 3-ethoxy-1,2-phenylene dioctanoate, 3-propoxy-1,2-phenylene dioctanoate, 3-isopropoxy-1,2-phenylene dioctanoate, 3-butoxy-1,2-phenylene dioctanoate, 3-isobutoxy-1,2-phenylene dioctanoate, 3-tert-butoxy-1,2-phenylene dioctanoate, 3-pentoxy-1,2-phenylene dioctanoate, 3-hexoxy-1,2-phenylene dioctanoate, 3-heptoxy-1,2-phenylene dioctanoate, 3-octoxy-1,2-phenylene dioctanoate, 3-nonoxy-1,2-phenylene dioctanoate, 3-decoxy-1,2-phenylene dioctanoate, 3-phenoxy-1,2-phenylene dioctanoate, 3-chloro-1,2-phenylene diisooctanoate, 3-bromo-1,2-phenylene diisooctanoate, 3-fluro-1,2-phenylene diisooctanoate, 3-iodo-1,2-phenylene diisooctanoate, 3-methyl-1,2-phenylene diisooctanoate, 3-ethyl-1,2-phenylene diisooctanoate, 3-butyl-1,2-phenylene diisooctanoate, 3-isobutyl-1,2-phenylene diisooctanoate, 3-tert-butyl-1,2-phenylene diisooctanoate, 3-isopropyl-1,2-phenylene diisooctanoate, 3-pentyl-1,2-phenylene diisooctanoate, 3-isopentyl-1,2-phenylene diisooctanoate, 3-hexyl-1,2-phenylene diisooctanoate, 3-heptyl-1,2-phenylene diisooctanoate, 3-octyl-1,2-phenylene diisooctanoate, 3-nonyl-1,2-phenylene diisooctanoate, 3-decyl-1,2-phenylene diisooctanoate, 3-dodecyl-1,2-phenylene diisooctanoate, 3-methoxy-1,2-phenylene diisooctanoate, 3-ethoxy-1,2-phenylene diisooctanoate, 3-propoxy-1,2-phenylene diisooctanoate, 3-isopropoxy-1,2-phenylene diisooctanoate, 3-butoxy-1,2-phenylene diisooctanoate, 3-isobutoxy-1,2-phenylene diisooctanoate, 3-tert-butoxy-1,2-phenylene diisooctanoate, 3-pentoxy-1,2-phenylene diisooctanoate, 3-hexoxy-1,2-phenylene diisooctanoate, 3-heptoxy-1,2-phenylene diisooctanoate, 3-octoxy-1,2-phenylene diisooctanoate, 3-nonoxy-1,2-phenylene diisooctanoate, 3-decoxy-1,2-phenylene diisooctanoate, 3-phenoxy-1,2-phenylene diisooctanoate, 3-chloro-1,2-phenylene dinonanoate, 3-bromo-1,2-phenylene dinonanoate, 3-fluro-1,2-phenylene dinonanoate, 3-iodo-1,2-phenylene dinonanoate, 3-methyl-1,2-phenylene dinonanoate, 3-ethyl-1,2-phenylene dinonanoate, 3-butyl-1,2-phenylene dinonanoate, 3-isobutyl-1,2-phenylene dinonanoate, 3-tert-butyl-1,2-phenylene dinonanoate, 3-isopropyl-1,2-phenylene dinonanoate, 3-pentyl-1,2-phenylene dinonanoate, 3-isopentyl-1,2-phenylene dinonanoate, 3-hexyl-1,2-phenylene dinonanoate, 3-heptyl-1,2-phenylene dinonanoate, 3-octyl-1,2-phenylene dinonanoate, 3-nonyl-1,2-phenylene dinonanoate, 3-decyl-1,2-phenylene dinonanoate, 3-dodecyl-1,2-phenylene dinonanoate, 3-methoxy-1,2-phenylene dinonanoate, 3-ethoxy-1,2-phenylene dinonanoate, 3-propoxy-1,2-phenylene dinonanoate, 3-isopropoxy-1,2-phenylene dinonanoate, 3-butoxy-1,2-phenylene dinonanoate, 3-isobutoxy-1,2-phenylene dinonanoate, 3-tert-butoxy-1,2-phenylene dinonanoate, 3-pentoxy-1,2-phenylene dinonanoate, 3-hexoxy-1,2-phenylene dinonanoate, 3-heptoxy-1,2-phenylene dinonanoate, 3-octoxy-1,2-phenylene dinonanoate, 3-nonoxy-1,2-phenylene dinonanoate, 3-decoxy-1,2-phenylene dinonanoate, 3-phenoxy-1,2-phenylene dinonanoate, 3-chloro-1,2-phenylene didecanoate, 3-bromo-1,2-phenylene didecanoate, 3-fluro-1,2-phenylene didecanoate, 3-iodo-1,2-phenylene didecanoate, 3-methyl-1,2-phenylene didecanoate, 3-ethyl-1,2-phenylene didecanoate, 3-butyl-1,2-phenylene didecanoate, 3-isobutyl-1,2-phenylene didecanoate, 3-tert-butyl-1,2-phenylene didecanoate, 3-isopropyl-1,2-phenylene didecanoate, 3-pentyl-1,2-phenylene didecanoate, 3-isopentyl-1,2-phenylene didecanoate, 3-hexyl-1,2-phenylene didecanoate, 3-heptyl-1,2-phenylene didecanoate, 3-octyl-1,2-phenylene didecanoate, 3-nonyl-1,2-phenylene didecanoate, 3-decyl-1,2-phenylene didecanoate, 3-dodecyl-1,2-phenylene didecanoate, 3-methoxy-1,2-phenylene didecanoate, 3-ethoxy-1,2-phenylene didecanoate, 3-propoxy-1,2-phenylene didecanoate, 3-isopropoxy-1,2-phenylene didecanoate, 3-butoxy-1,2-phenylene didecanoate, 3-isobutoxy-1,2-phenylene didecanoate, 3-tert-butoxy-1,2-phenylene didecanoate, 3-pentoxy-1,2-phenylene didecanoate, 3-hexoxy-1,2-phenylene didecanoate, 3-heptoxy-1,2-phenylene didecanoate, 3-octoxy-1,2-phenylene didecanoate, 3-nonoxy-1,2-phenylene didecanoate, 3-decoxy-1,2-phenylene didecanoate and 3-phenoxy-1,2-phenylene didecanoate, 5-(tert-butyl)-3-methyl-1,2-phenylene diacetate, 5-(tert-butyl)-3-methyl-1,2-phenylene dipropionate, 5-(tert-butyl)-3-methyl-1,2-phenylene bis(2-methylpropanoate), 5-(tert-butyl)-3-methyl-1,2-phenylene bis(2,2-dimethylpropanoate), 5-(tert-butyl)-3-methyl-1,2-phenylene dibutyrate, 5-(tert-butyl)-3-methyl-1,2-phenylene bis(3-methylbutanoate), 5-(tert-butyl)-3- methyl-1,2-phenylene bis(3,3-dimethylbutanoate), 5-(tert-butyl)-3-methyl-1,2-phenylene dipentanoate, 5-(tert-butyl)-3-methyl-1,2-phenylene dihexanoate, 5-(tert-butyl)-3-methyl-1,2-phenylene diheptanoate, 5-(tert-butyl)-3-methyl-1,2-phenylene dioctanoate, 5-(tert-butyl)-3-methyl-1,2-phenylene dinonanoate, 5-(tert-butyl)-3-methyl-1,2-phenylene bis(decanoate), 5-(tert-butyl)-3-methyl-1,2-phenylene diundecanoate, 5-(tert-butyl)-3-methyl-1,2-phenylene bis(2-ethylhexanoate), 3-methyl-1,2-phenylene diacetate, 3-methyl-1,2-phenylene dipropionate, 3-methyl-1,2-phenylene bis(2-methylpropanoate), 3-methyl-1,2-phenylene bis(2,2-dimethylpropanoate), 3-methyl-1,2-phenylene dibutyrate, 3-methyl-1,2-phenylene bis(3-methylbutanoate), 3-methyl-1,2-phenylene bis(3,3-dimethylbutanoate), 3-methyl-1,2-phenylene dipentanoate, 3-methyl-1,2-phenylene dihexanoate, 3-methyl-1,2-phenylene bis(2-ethylhexanoate), 3-methyl-1,2-phenylene diheptanoate, 3-methyl-1,2-phenylene dioctanoate, 3-methyl-1,2-phenylene dinonanoate, 3-methyl-1,2-phenylene bis(decanoate), 1,2-phenylenebis(methylene) diacetate, 1,2-phenylenebis(methylene) dipropionate, 1,2-phenylenebis(methylene) bis(2-methylpropanoate), 1,2-phenylenebis(methylene) bis(2,2-dimethylpropanoate), 1,2-phenylenebis(methylene) dibutyrate, 1,2-phenylenebis(methylene) bis(3-methylbutanoate), 1,2-phenylenebis(methylene) bis(3,3-dimethylbutanoate), 1,2-phenylenebis(methylene) dipentanoate, 1,2-phenylenebis(methylene) dihexanoate, 1,2-phenylenebis(methylene) bis(2-ethylhexanoate), 1,2-phenylenebis(methylene) diheptanoate, 1,2-phenylenebis(methylene) dioctanoate, 1,2-phenylenebis(methylene) dinonanoate, (3-methyl-1,2-phenylene)bis(methylene) diacetate, (3-methyl-1,2-phenylene)bis(methylene) dipropionate, (3-methyl-1,2-phenylene)bis(methylene) bis(2-methylpropanoate), (3-methyl-1,2-phenylene)bis(methylene) bis(2,2-dimethylpropanoate), (3-methyl-1,2-phenylene)bis(methylene) dibutyrate, (3-methyl-1,2-phenylene)bis(methylene) bis(3-methylbutanoate), (3-methyl-1,2-phenylene)bis(methylene) bis(3,3-dimethylbutanoate), (3-methyl-1,2-phenylene)bis(methylene) dipentanoate, (3-methyl-1,2-phenylene)bis(methylene) dihexanoate, (3-methyl-1,2-phenylene)bis(methylene) bis(2-ethylhexanoate), (3-methyl-1,2-phenylene)bis(methylene) diheptanoate, (3-methyl-1,2-phenylene)bis(methylene) dioctanoate, (3-methyl-1,2-phenylene)bis(methylene) dinonanoate, (5-(tert-butyl)-3-methyl-1,2-phenylene)bis(methylene) diacetate, (5-(tert-butyl)-3-methyl-1,2-phenylene) bis(methylene) dipropionate, (5-(tert-butyl)-3-methyl-1,2-phenylene)bis(methylene) bis(2-methylpropanoate), (5-(tert-butyl)-3-methyl-1,2-phenylene) bis(methylene) bis(2,2-dimethylpropanoate), (5-(tert-butyl)-3-methyl-1,2-phenylene)bis(methylene) dibutyrate, (5-(tert-butyl)-3-methyl-1,2-phenylene)bis(methylene) bis(3-methylbutanoate), (5-(tert-butyl)-3-methyl-1,2-phenylene)bis(methylene) bis(3,3-dimethylbutanoate), (5-(tert-butyl)-3-methyl-1,2-phenylene)bis(methylene) dipentanoate, (5-(tert-butyl)-3-methyl-1,2-phenylene)bis(methylene) dihexanoate, (5-(tert-butyl)-3-methyl-1,2-phenylene)bis(methylene)bis(2-ethylhexanoate), (5-(tert-butyl)-3-methyl-1,2-phenylene)bis(methylene) diheptanoate, (5-(tert-butyl)-3-methyl-1,2-phenylene)bis(methylene) dioctanoate, (5-(tert-butyl)-3-methyl-1,2-phenylene) bis(methylene) dinonanoate, (4-(tert-butyl)-1,2-phenylene)bis(methylene) diacetate, (4-(tert-butyl)-1,2-phenylene)bis(methylene) dipropionate, (4-(tert-butyl)-1,2-phenylene)bis(methylene) bis(2-methylpropanoate), (4-(tert-butyl)-1,2-phenylene)bis(methylene) bis(2,2-dimethylpropanoate), (4-(tert-butyl)-1,2-phenylene)bis(methylene) dibutyrate, (4-(tert-butyl)-1,2-phenylene)bis(methylene) bis(3-methylbutanoate), (4-(tert-butyl)-1,2-phenylene)bis(methylene) bis(3,3-dimethylbutanoate), (4-(tert-butyl)-1,2-phenylene)bis(methylene) dipentanoate, (4-(tert-butyl)-1,2-phenylene)bis(methylene) dihexanoate, (4-(tert-butyl)-1,2-phenylene)bis(methylene) bis(2-ethylhexanoate), (4-(tert-butyl)-1,2-phenylene)bis(methylene) diheptanoate, (4-(tert-butyl)-1,2-phenylene)bis(methylene) dioctanoate, (4-(tert-butyl)-1,2-phenylene)bis(methylene) dinonanoate.

In another embodiment, the other internal donors in addition to the internal donor based on 1,2-phenylenedioate can be used. This means that during catalyst synthesis, other internal electron donor can be added in addition to the internal electron donor based on 1,2-phenylenediaotes. The other internal donor is phthalates, benzoates, diethers, succinates, malonates, carbonates, silyl esters, amide esters and combinations thereof. Specific examples include, but are not limited to di-n-butyl phthalate, di-iso-butyl phthalate, di-2-ethylhexyl phthalate, methyl benzoate, ethyl benzoate, propyl benzoate, phenyl benzoate, cyclohexyl benzoate, methyl toluate, ethyl toluate, p-ethoxy ethyl benzoate, p-isopropoxy ethyl benzoate, diethyl succinate, di-propyl succinate, diisopropyl succinate, dibutyl succinate, diisobutyl succinate, diethyl malonate, diethyl ethylmalonate, diethyl propyl malonate, diethyl isopropylmalonate, diethyl butylmalonate, diethyl 1,2-cyclohexanedicarboxylate, di-2-ethylhexyl 1,2-cyclohexanedicarboxylate, di-2-isononyl 1,2-cyclohexanedicarboxylate, methyl anisate, ethyl anisate and diether compounds such as 9,9-bis(methoxymethyl)fluorine, 2-isopropyl-2-isopentyl-1,3-dimethoxypropane, 2,2-diisobutyl-1,3-dimethoxypropane, 2,2-diisopentyl-1,3-dimethoxypropane, 2-isopropyl-2-cyclohexyl-1,3-dimethoxypropane.

The present invention describes the process of preparation of catalyst component. In an embodiment, the solid precatalyst component is prepared through the process which requires contacting magnesium based precursor with acyl halides in the presence of internal donor based on phenylene dioates and the solvent. In an embodiment, acyl halides represented by RCOX where R is H, $C_1$-$C_{20}$ linear or branched alkyl group which can be linked with cyclic rings, $C_6$-$C_{14}$ aryl groups, $C_3$-$C_{15}$ cycloalkyl groups, $C_1$-$C_{20}$ alkoxy group, may or may not containing heteroatom and X is selected from halides. The examples include but not limiting to formyl chloride, acetyl chloride, benzoyl chloride, tert-butylbenzoyl chloride, 2-ethyl hexanoyl chloride, valeryoyl chloride, isovaleryoyl chloride, phthaloyl chloride, 2,3-naphthalenedicarboxylic dichloride, endo-5-norborene-2,3-dicarboxylic acid dichloride, maleic dichloride, citraconic acid dichloride and the like. In another embodiment, the molar ratio of magnesium to acyl halides is between 1:5 to 1:0.0001. In one of the preferred embodiment, the molar ratio of magnesium to acyl halides is between 1:1 to 1:0.001. In another embodiment, mixtures of acyl halides may be used.

The present invention describes the process of preparation of catalyst component. In an embodiment, the solid precatalyst component is prepared through the process which requires contacting magnesium based precursor with acyl halides in the presence of internal donor based on phenylene dioates and the solvent. In an embodiment, the solvent can be aromatic or aliphatic and polar or non polar in nature, examples not limiting to benzene, decane, kerosene, ethyl benzene, chlorobenzene, dichlorobenzene, toluene, o-chlorotoluene, xylene, dichloromethane, chloroform, cyclohexane and the like. In another embodiment, the contact time of the reaction mixture is immediate to 5 h. In one of the preferred embodiment, the contact time of the reaction mixture is immediate to 1 h. In another preferred embodiment, the contact time of the reaction mixture is immediate to 0.5 h. In yet another embodiment, the reaction mixture can be heated from temperature 10° C. to 200° C. In one of the preferred embodiment, the reaction mixture can be heated from temperature 20° C. to 120° C.

The magnesium based precursor can be contacted first with the internal donor followed by the acyl halides or magnesium based precursor can be first contacted with the acyl halides followed by the contact with internal donor. It is also possible to mix internal donor with the acyl halides and then contact with the magnesium precursor in presence of the solvent. In an embodiment, the solid precatalyst component can be isolated.

The present invention describes the process of preparation of catalyst component. In an embodiment, solid precatalyst component is treated with transition metal compound selected from compounds represented by $M(OR')_pX_{4-p}$, where M is a transition metal and is selected from a group comprising of Ti, V, Zr, and Hf, preferably Ti; X is a halogen atom; R' is a hydrocarbon group and p is an integer having value equal to or less than 4. In one of the preferred embodiment, solid precatalyst component is treated with transition metal halide selected from compounds represented by $M(OR')_pX_{4-p}$, where M is a transition metal and is selected from a group comprising of Ti, V, Zr, and Hf, preferably Ti; X is a halogen atom; R' is a hydrocarbon group and p is an integer having value equal to or less than 3.

In another embodiment, before the contact of the solid precatalyst component with transition metal compound, the addition of acyl halides to solid precatalyst component is desirable. This addition can be carried out for immediate to 30 min. In one of the preferred embodiment, this addition can be carried out for immediate to 15 min. In another embodiment, the reaction mixture can be heated from temperature 10° C. to 200° C. In one of the preferred embodiment, this addition can be carried out for from 20° C. to 120° C. In another embodiment, the molar ratio of magnesium to acyl halides is between 1:5 to 1:0.0001. In one of the preferred embodiment, the molar ratio of magnesium to acyl halides is between 1:1 to 1:0.001.

In yet another embodiment of the present invention, the transition metal compound represented by $M(OR')_pX_{4-p}$ is selected from a group comprising of transition metal tetrahalide, alkoxy transition metal trihalide/aryloxy transition metal trihalide, dialkoxy transition metal dihalide, trialkoxy transition metal monohalide, tetraalkoxy transition metal and mixtures thereof; wherein:
(a) the transition metal tetrahalide is selected from a group comprising of titanium tetrachloride, titanium tetrabromide and titanium tetraiodide and the likes for V, Zr and Hf;
(b) alkoxy transition metal trihalide/aryloxy transition metal trihalide is selected from a group comprising of methoxytitanium trichloride, ethoxytitanium trichloride, butoxytitanium trichloride and phenoxytitanium trichloride and the likes for V, Zr and Hf;
(c) dialkoxy transition metal dihalide is diethoxy transition metal dichloride and the likes for V, Zr and Hf;
(d) trialkoxy transition metal monohalide is triethoxy transition metal chloride and the likes for V, Zr and Hf; and
(e) tetraalkoxy transition metal is selected from a group comprising of tetrabutoxy titanium and tetraethoxy titanium and the likes for V, Zr and Hf.

The contact temperature of reaction mixture and the transition metal compound is between about −50° C. and about 150° C. In one of the preferred embodiment the contact temperature of reaction mixture and the transition metal compound is between about −30° C. and about 120° C.

A person skilled in the present art knows that the titanium to magnesium mole ratios that are usually used in about 20 to 80 moles. In an embodiment, the titanium compound is added in amounts ranging from usually about at least 1 to 20 moles, with respect to one mole of magnesium. In one of the preferred embodiment the titanium compound is added in amounts ranging from 5 to 15 moles, with respect to one mole of magnesium. However usage of higher titanium compound is neither advantageous nor detrimental to catalyst synthesis process.

In an embodiment, the contact with transition metal compound can be either neat or in solvent which can be chlorinated or non chlorinated aromatic or aliphatic in nature, examples not limiting to benzene, decane, kerosene, ethyl benzene, chlorobenzene, dichlorobenzene, toluene, o-chlorotoluene, xylene, dichloromethane, chloroform, cyclohexane and the like, comprising from 40 to 60 volume percent. In another embodiment, this treatment is either one shot or dropwise or controlled.

In a preferred embodiment, this reaction system is gradually heated to the temperature effective to carry out the reaction, preferably about −50° C. and about 150° C. In one of the preferred embodiment, this reaction system is gradually heated to the temperature effective to carry out the reaction about −30° C. and about 120° C. The heating is instigated at a rate of 0.1 to 10.0° C./minute. In one of the preferred embodiment the heating is instigated at a rate of or at a rate of 1 to 5.0° C./minute. The resultant is the solid component in the solvent comprising of magnesium, transition metal, internal donor and halogen components.

The procedure of contacting the transition metal component may be repeated one, two, three or more times as desired. In an embodiment, the resulting solid material recovered from the mixture can be contacted one or more times with the mixture of transition metal component in solvent for at least 10 minutes up to 60 minutes, at temperature from about 25° C. to about 150° C. In one of the preferred embodiment, the temperature is from about 30° C. to about 130° C. In another embodiment, before the contact with transition metal component, the addition of acyl halides is desirable. This addition can be carried out for immediate to 30 min. In one of the preferred embodiment, this addition can be carried out for immediate to 15 min. In another embodiment, the reaction mixture can be heated from temperature 20° C. to 200° C. In one of the preferred embodiment, the reaction mixture can be heated from temperature 30° C. to 150° C. In another embodiment, the molar ratio of magnesium to acyl halides is between 1:5 to 1:0.0001. In one of the preferred embodiment, the molar ratio of magnesium to acyl halides is between 1:1 to 1:0.001.

The resulting solid component comprising of magnesium, titanium, halogen, and the internal electron donor can be separated from the reaction mixture either by filtration or decantation and finally washed with inert solvent to remove unreacted titanium component and other side products. Usually, the resultant solid material is washed one or more times with inert solvent which is typically a hydrocarbon including, and not limiting to aliphatic hydrocarbon like isopentane, isooctane, hexane, pentane or isohexane. In an embodiment, the resulting solid mixture is washed one or more times with inert hydrocarbon based solvent preferably, hexane at temperature from about 20° C. to about 80° C. In one of the preferred embodiment the resulting solid mixture is washed one or more times with inert hydrocarbon based solvent at temperature from about 25° C. to about 70° C. The solid catalyst can be separated and dried or slurried in a hydrocarbon specifically heavy hydrocarbon such as mineral oil for further storage or use.

In an embodiment, the catalyst component includes from about 5.0 wt % to 30 wt % of internal electron donor, titanium is from about 1.0 wt % to 6.0 wt % and magnesium is from about 15 wt % to 20 wt %.

The present invention provides the catalyst system for polymerization of olefins. In the embodiment, the method of polymerization process is provided where the catalyst system is contacted with olefin under polymerization conditions. The catalyst system includes catalyst component, organoaluminum compounds and external electron donors. The catalyst component includes combination of magnesium moiety, titanium moiety and an internal donor.

Further, the present invention provides a method of polymerizing and/or copolymerizing olefins where the catalyst system is contacted with olefin under polymerization conditions. The catalyst system includes catalyst component, cocatalyst and external electron donors. The co-catalyst may include hydrides, organoaluminum, lithium, zinc, tin, cadmium, beryllium, magnesium, and combinations thereof. In an embodiment, the preferred co-catalyst is organoaluminum compounds.

The olefins according to the present invention includes from C2-C20. The ratio of titanium (from catalyst component):aluminum (from organoaluminum compound):external donor can be from 1:5-1000:0-250, preferably in the range from 1:25-500:25-100. The present invention provides the catalyst system. The catalyst system includes catalyst component, organoaluminum compounds and external electron donors. In an embodiment, the organoaluminum compounds include, not limiting to, alkylaluminums such as trialkylaluminum such as preferably triethylaluminum, triisopropylaluminum, triisobutylaluminum, tri-n-butylaluminum, tri-n-hexylaluminum, tri-n-octylaluminum; trialkenylaluminums such as triisoprenyl aluminum; dialkylaluminum halides such as diethylaluminum chloride, dibutylaluminum chloride, diisobutylaluminum chloride and diethyl aluminum bromide; alkylaluminum sesquihalides such as ethylaluminum sesquichloride, butylaluminum sesquichloride and ethylaluminum sesquibromide; dialkylaluminum hydrides such as diethylaluminum hydride and dibutylaluminum hydride; partially hydrogenated alkylaluminum such as ethylaluminum dihydride and propylaluminum dihydride and aluminoxane such as methylaluminoxane, isobutylaluminoxane, tetraethylaluminoxane and tetraisobutylaluminoxane; diethylaluminum ethoxide.

The mole ratio of aluminum to titanium is from about 5:1 to about 1000:1 or from about 10:1 to about 700:1, or from about 25:1 to about 500:1.

The present invention provides the catalyst system. The catalyst system includes catalyst component, organoaluminum compounds and external electron donors. The external electron donors are organosilicon compounds, diethers and alkoxy benzoates. The external electron donor for olefin polymerization when added to the catalytic system as a part of co-catalyst retains the stereospecificity of the active sites, convert non-stereospecific sites to stereospecific sites, poisons the non-stereospecific sites and also controls the molecular weight distributions while retaining high performance with respect to catalytic activity. The external electron donors which are generally organosilicon compounds include, but are not limited to, trimethylmethoxysilane, trimethylethoxysilane, dimethyldimethoxysilane, dimethyldiethoxysilane, diisopropyldimethoxysilane, diisobutyldimethoxysilane, t-butylmethyldimethoxysilane, t-butylmethyldiethoxysilane, t-amylmethyldiethoxysilane, dicyclopentyldimethoxysilane, diphenyldimethoxysilane, phenylmethyldimethoxysilane, diphenyldiethoxysilane, bis-o-tolydimethoxysilane, bis-m-tolydimethoxysilane, bis-p-tolydimethoxysilane, bis-p-tolydiethoxysilane, bisethylphenyldimethoxysilane, dicyclohexyldimethoxysilane, cyclohexylmethyldimethoxysilane, cyclohexylmethyldiethoxysilane, ethyltrimethoxysilane, ethyltriethoxysilane, vinyltrimethoxysilane, methyltrimethoxysilane, n-propyltriethoxysilane, decyltrimethoxysilane, decyltriethoxysilane, phenyltrimethoxysilane, gamma-chloropropyltrimethoxysilane, methyltriethoxysilane, ethyltriethoxysilane, vinyltriethoxysilane, t-butyltriethoxysilane, n-butyltriethoxysilane, iso-butyltriethoxysilane, phenyltriethoxysilane, gamma-aminopropyltriethoxysilane, cholotriethoxysilane, ethyltriisopropoxysilane, vinyltirbutoxysilane, cyclohexyltrimethoxysilane, cyclohexyltriethoxysilane, 2-norbornanetrimethoxysilane, 2-norbornanetriethoxysilane, 2-norbornanemethyldimethoxysilane, ethyl silicate, butyl silicate, trimethylphenoxysilane, and methyltriallyloxysilane, cyclopropyltrimethoxysilane, cyclobutyltrimethoxysilane, cyclopentyltrimethoxysilane, 2-methylcyclopentyltrimethoxysilane, 2,3-dimethylcyclopentyltrimethoxysilane, 2,5-dimethylcyclopentyltrimethoxysilane, cyclopentyltriethoxysilane, cyclopentenyltrimethoxysilane, 3-cyclopentenyltrimethoxysilane, 2,4-cyclopentadienyltrimethoxysilane, indenyltrimethoxysilane and fluorenyltrimethoxysilane; dialkoxysilanes such as dicyclopentyldimethoxysilane, bis(2-methylcyclopentyl)dimethoxysilane, bis(3-tertiary butyl-cyclopentyl)dimethoxysilane, bis(2,3-dimethylcyclopentyl)dimethoxysilane, bis(2,5-dimethylcyclopentyl)dimethoxysilane, dicyclopentyldiethoxysilane, dicyclobutyldiethoxysilane, cyclopropylcyclobutyldiethoxysilane, dicyclopentenyldimethoxysilane, di(3-cyclopentenyl)dimethoxysilane, bis(2,5-dimethyl-3-cyclopentenyl)dimethoxysilane, di-2,4-cyclopentadienyl)dimethoxysilane, bis(2,5-dimethyl-2,4-cyclopentadienyl)dimethoxysilane, bis(1-methyl-1-cyclopentylethyl)dimethoxysilane, cyclopentylcyclopentenyldimethoxysilane, cyclopentylcyclopentadienyldimethoxysilane, diindenyldimethoxysilane, bis(1,3-dimethyl-2-indenyl)dimethoxysilane, cyclopentadienylindenyldimethoxysilane, difluorenyldimethoxysilane, cyclopentylfluorenyldimethoxysilaneand indenylfiuorenyldimethoxysilane; monoalkoxysilanes such as tricyclopentylmethoxysilane, tricyclopentenylmethoxysilane, tricyclopentadienylmethoxysilane, tricyclopentylethoxysilane, cyclopentylmethylmethoxysilane, dicyclopentylethylmethoxysilane, dicyclopentylmethylethoxysilane, cyclopentyldimethylmethoxysilane, cyclopentyldiethylmethoxysilane, cyclopentyldimethylethoxysilane, bis(2,5-dimethylcyclopentyl)cyclopentylmethoxysilane, dicyclopentylcyclopentenylmethoxysilane, dicyclopentylcyclopentenadienylmethoxysilane, diindenylcyclopentylmethoxysilane and ethylenebis-cyclopentyldimethoxysilane; aminosilanes such as aminopropyltriethoxysilane, n-(3-triethoxysilylpropyl)amine, bis [(3-triethoxysilyl)propyl]amine, aminopropyltrimethoxysilane, aminopropylmethyldiethoxysilane, hexanediaminopropyltrimethoxysilane.

In an embodiment, the external electron donor, other than organosilicon compounds include, but not limited to amine, diether, esters, carboxylate, ketone, amide, phosphine, carbamate, phosphate, sulfonate, sulfone and/or sulphoxide. The external electron donor is used in such an amount to give a molar ratio of organoaluminum compound to the said external donor from about 0.1 to 500, preferably from 1 to 300.

In the present invention, the polymerization of olefins is carried out in the presence of the catalyst system described above. The catalyst system is contacted with olefin under polymerization conditions to produce desired polymer products. The polymerization process can be carried out such as by slurry polymerization using an inert hydrocarbon solvent as a diluent, or bulk polymerization_using the liquid monomer as a reaction medium and in gas-phase operating in one or more fluidized or mechanically agitated bed reactors. In an embodiment, polymerization is carried out as such. In another embodiment, the copolymerization is carried out using at least two polymerization zones.

The catalyst of the invention can be used in the polymerization of the above-defined olefin $CH_2$=CHR, the examples of said olefin include ethylene, propylene, 1-butene, 4-methyl-1-pentene, 1-hexene, and 1-octene.

An aspect of the present invention discloses that the prior contact of acyl halides with the solid precatalyst component produces a catalyst with improved activity and control soluble contents when compared to catalyst synthesized in absence of contact of acyl halides. In an embodiment, the contact of acyl halides produces catalyst having higher activity, more control over soluble contents and improved morphology of the resultant polymer. This aspect of the catalyst was understood using WAXD. WAXD measurements were carried using a Panalytical, Empyrean X-ray diffractometer in a special cell under inert atmosphere. Crystallite Size calculations were performed using High Score Plus software.

Figure 2:
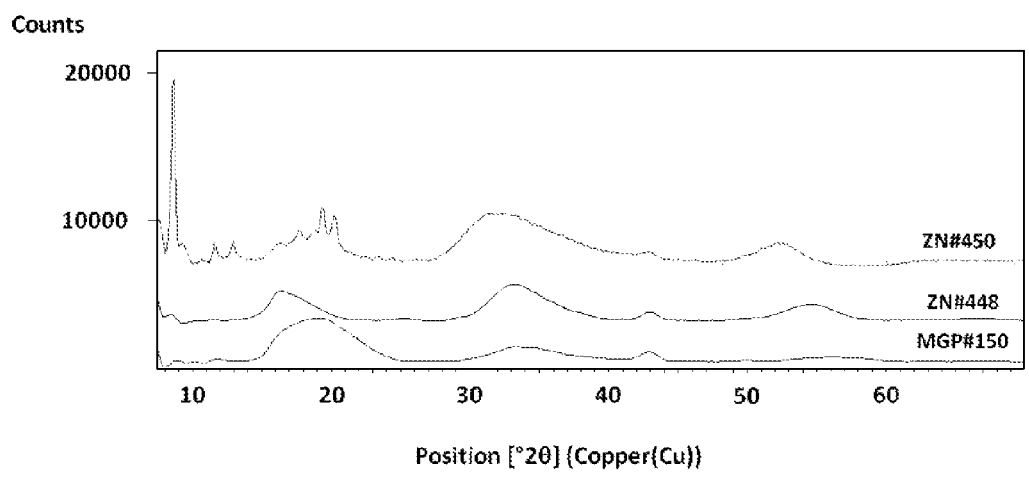
FIG. 2: XRD pattern of organomagnesium precursor, precursor treated with internal donor and precursor treated with acyl chloride in presence of internal donor.

ZN#316 obtained by previous contact of magnesium precursor with benzoyl chloride and ZN#317 obtained without previous contact show distinct XRD patterns (FIG. 1) with main difference in the range of 8-18 2Θ. While ZN#316 exhibit 2 distinct peaks at 11.1 and 16.2 2Θ, ZN#317 had only one peak at 14.8 2Θ. This region is attributed to the arrangement of Cl—Mg—Cl triple layers in the different $MgCl_2$ phases and the distinct features of ZN#316 and ZN#317 indicates uniqueness in structure of Cl—Mg—Cl triple layers for both. Further, XRD pattern (FIG. 2) of MGP#150 corresponds to amorphous solid and ZN#448 obtained by treatment of MGP#150 with internal donor (ID#19) also had features of amorphous solid only. Noteworthy are the changes in crystallinity of ZN#450 obtained by treatment of MGP#150 with internal donor (ID#19) and benzoyl chloride, an acyl chloride. Development of sharp peaks, characteristics of development of crystallinity, due to reaction between magnesium precursor, internal donor and benzoyl chloride indicates both physical and chemical transformations and formation of new phases. These transformations are unique to the catalyst synthesis process and had significant impact on the final catalyst crystallinity as well.

In particular, said catalyst can be used to produce, the following products such as high-density polyethylene (HDPE, having a density higher than 0.940 $g/cm^3$), which includes ethylene homopolymer and copolymer of ethylene and α-olefins having 3 to 12 carbon atoms; linear low-density polyethylene (LLDPE, having a density lower than 0.940 $g/cm^3$), and very low density and ultra low density polyethylene (VLDPE and ULDPE, having a density lower than 0.920 $g/cm^3$, and as low as 0.880 $g/cm^3$), consisting of the copolymer of ethylene and one or more α-olefins having 3 to 12 carbon atoms, wherein the molar content of the unit derived from ethylene is higher than 80%; elastomeric copolymer of ethylene and propylene, and elastomeric terpolymers of ethylene, propylene and butene-1 as well as diolefins at a small ratio, wherein the weight content of the unit derived from ethylene is between about 30% and 70%; isotactic polypropylene and crystalline copolymer of propylene and ethylene and/or other α-olefins, wherein the content of the unit derived from propylene is higher than 85% by weight (random copolymer); impact propylene polymer, which are produced by sequential polymerization of propylene and the mixture of propylene and ethylene, with the content of ethylene being up to 40% by weight; copolymer of propylene and 1-butene, containing a great amount, such as from 10 to 40 percent by weight, of unit derived from 1-butene. It is especially significant that the propylene polymers produced by using the catalysts of the invention have high isotactic index.

The polymerization is carried out at a temperature from 20 to 120° C. In one of the preferred embodiment the polymerization is carried out at a temperature from 40 to 80° C.

When the polymerization is carried out in gas phase, operation pressure is usually in the range of from 5 to 100 bar. In one of the preferred embodiment, operation pressure is usually in the range of from 10 to 50 bar. The operation pressure in bulk polymerization is usually in the range of from 10 to 150 bar. In one of the preferred embodiment, the operation pressure in bulk polymerization is usually in the range of from 15 to 50 bar. The operation pressure in slurry polymerization is usually in the range of from 1 to 10 bar. In one of the preferred embodiment, the operation pressure in slurry polymerization is usually in the range of from 2 to 7 bar. Hydrogen can be used to control the molecular weight of polymers.

In the present invention, the polymerization of olefins is carried out in the presence of the catalyst system described in the invention. The described catalyst can be directly added to the reactor for polymerization or can be prepolymerized i.e. catalyst is subjected to a polymerization at lower conversion extent before being added to polymerization reactor. Prepolymerization can be performed with olefins preferably ethylene and/or propylene where the conversion is controlled in the range from 0.2 to 500 gram polymer per gram catalyst.

In the present invention, the polymerization of olefins in presence of the described catalyst system leads to the formation of polyolefins having xylene solubility (XS) ranging from about 0.2% to about 15%. In another embodiment, polyolefins have xylene solubility (XS) from about 1% to about 8%. Here XS refers to the weight percent of polymer that get dissolves into hot xylene generally for measuring the tacticity index such as highly isotactic polymer will have low XS % value i.e. higher crystallinity, whereas low isotactic polymer will have high XS % value.

The present invention provides the catalyst system. The catalysts system when polymerizes olefins provides polyolefins having melt flow indexes (MFI) of about 0.1 to about 100 which is measured according to ASTM standard D1238. In an embodiment, polyolefins having MFI from about 0.1 to about 30 are produced.

The present invention also provides the catalyst system. The catalysts system when polymerizes olefins provides polyolefins having bulk densities (BD) of at least about 0.3 g/cc.

The following non-limiting examples illustrate in detail about the invention. However, they are, not intended to be limiting the scope of present invention in any way.

A. Internal Donor Synthesis

Example 1: Synthesis of 1,2-phenylene Diisopentanoate (ID#18)

To a mixture of catechol (5.0 g, 0.045 mol) isovaleric anhydride (21.5 g, 0.113 mol) and Montmorillonite KSF (1.0 g) was added. After being stirred at 75° C. for 8 h, the catalyst was removed by filtration and washed with diethyl ether. The solvent was evaporated under reduced pressure at 120° C. The residue was pure enough for general purposes and further purification was achieved by recrystallization from n-pentane. The pure compound appeared as white crystalline solid (yield >99.0%).

Example 2: Synthesis of 4-t-butyl-1,2-phenylene diisopentanoate (ID#19)

To a mixture of 4-t-butylcatechol (5.0 g, 0.030 mol) Isobutyric anhydride (21.5 g, 0.135 mol) and Montmorillonite KSF (1.0 g) was added. After being stirred at 70° C. for 8 h, the catalyst was removed by filtration and washed with diethyl ether. The solvent was evaporated under reduced pressure at 120° C. The residue was pure enough for general purposes and further purification was achieved by kugelrohr distillation under vacuum. The pure compound appeared as light yellow color liquid (yield >95.0%).

Example 3: Synthesis of 4-t-butyl-1,2-phenylene diacetate (ID#9)

To a mixture of 4-t-butylcatechol (5.0 g, 0.03 mol) acetic anhydride (12.5 g, 0.125 mol) and montmorillonite KSF (1.0 g) was added. After being stirred at room temperature for 20 h, the catalyst was removed by filtration and washed with diethyl ether. The solvent was evaporated under reduced pressure. The residue was pure enough for general purposes and further purification was achieved by recrystallization from diethyl ether and n-pentane. The pure compound appeared as white crystalline powder (yield >95.0%).

Example 4: Synthesis of 1,2-phenylene diacetate (ID#1)

To a mixture of catechol (5.0 g, 0.045 mol) acetic anhydride (18.54 g, 0.1816 mol) and montmorillonite KSF (0.7 g) was added. After being stirred at room temperature for 20 h, the catalyst was removed by filtration and washed with diethyl ether. The solvent was evaporated under reduced pressure. The residue was pure enough for general purposes and further purification was achieved by recrystallization from diethyl ether. The pure compound appeared as white crystalline powder (yield >99.0%).

Example 5: Synthesis of 4-chloro-1,2-phenylene diisopentanoate (ID#22)

To a mixture of 4-chlorocatechol (2.0 g, 0.0138 mol) Isobutyric anhydride (10.3 g, 0.055 mol) and Montmorillonite KSF (0.5 g) was added. After being stirred at 70° C. for 8 h, the catalyst was removed by filtration and washed with diethyl ether. The solvent was evaporated under reduced pressure at 120° C. The residue was pure enough for general purposes and further purification was achieved by distillation under vacuum. (yield >95.0%).

Example 6: Synthesis of 4-t-butyl-1,2-phenylene bis(2-ethylhexanoate) (ID#29)

In a 1000 mL 2-neck round bottom flask equipped with magnetic stirrer, 4-tertiarybutyl catechol (50.0 g, 0.30 mol) was dissolved in dichloromethane (450 mL) and triethylamine (66.0 g, 0.64 mol) added. The reaction mixture was cooled under ice bath and then 2-ethylhexanoyl chloride (98.0 g, 0.60 mol) added slowly drop wise under vigorous stirring, after 5.0 minutes, white precipitate was formed and the reaction mixture was stirred for an additional 7 h at RT. The reaction mixture was filtered to remove $Et_3NH^+Cl^-$ which was solid and washed with diethyl ether. The pure product was obtained after removal of solvent from roto-evaporator (yield ~98.0%)

Example 7: Synthesis of diisobutyl 2,2'-((4-tert-butyl-1,2-phenylene)bis(oxy)diacetate (ID#26)

4-tert butylcatechol di(oxyacetic) acid (40.0 g, 0.14 mol), isobutanol (250 mL), benzene 100 mL and concentrated sulfuric acid (10.0 mL) were refluxed with Dean-stark distillation under stirring for 12 h at 85° C. The isobutanol and benzene was removed from roto-evaporator and the residue was dissolved in dichloromethane (100 ml). The organic layer was treated with saturated sodium bicarbonate solution (2×100 ml), and water (2×100 ml), dried (anhydrous sodium sulphate) and dichloromethane was removed under reduced pressure. The pure product was obtained after the krughlohr distillation (220° C., 10 mbar pressure) as yellow color oil (yield ~87%).

Example 8: Synthesis of 1,2-phenylenebis(methylene)dibenzoate (ID#5)

1,2-phenylenedimethanol 5.0 g (0.0362 mol) was dissolved in 150 ml of dichloromethane and 7.32 g (0.724 mol) triethyl amine was added and the reaction mixture was cooled under ice bath. Benzoyl chloride 10.16 g (0.72 mol) dissolved in 20.0 mL of dichloromethane and slowly added drop wise through. The addition of benzoyl chloride was exothermic and white precipitate formed. The reaction was stirred for another 10 min under ice bath and slowly the reaction temperature was brought up to room temperature and stirred for another 3 h at RT. The solvent was removed from rotoevaporator and the resulting white precipitate suspended in diethyl ether and solid was filtered and washed twice with diethyl ether, after evaporation of the solvent pure compound obtained as white solid (yield~90.0%).

Example 9: Synthesis of 5-(tert-butyl)-3-methyl-1, 2-phenylenebis(3-methylbutanoate) (ID#32)

In a 500 mL 2-neck round bottom flask equipped with magnetic stirrer, 3-methyl-5-tert-butyl catechol (20.4 g, 0.13 mol) was dissolved in dichloromethane (250 mL) and triethylamine (23.0 g, 0.226 mol) added. The reaction mixture was cooled under ice bath and then isovaleryl chloride (27.3 g, 0.226 mol) added slowly drop wise under vigorous stirring, after 5.0 minutes, white precipitate was formed and the reaction mixture was stirred for an additional 7 h at RT. The reaction mixture was filtered to remove $Et_3NH^+Cl^-$ which was solid and washed with diethyl ether. After removal of solvent, the pure product was obtained as light brown color viscous liquid. (yield~98%)

TABLE 1

Internal donor structures synthesized

| Internal donor | Structure | ¹H NMR |
|---|---|---|
| 1,2-phenylene diisopentanoate (ID#18) | | 0.92 ppm (12H), 2.20 (4H), 2.38 (2H), 7.23-7.26 (8H) |
| 4-t-butyl-1,2-phenylene diisopentanoate (ID#19) | | 0.92 ppm (12H), 1.35 (9H) 2.20 (4H), 2.38 (2H), 7.23-7.5 (6H) |
| 4-t-butyl-1,2-phenylene diacetate (ID#9) | | 1.35 (9H) 2.26 (6H), 2.38 (2H), 7.22-7.5 (6H) |
| 1,2-phenylene diacetate (ID#1) | | 2.28 (6H), 7.22-7.28 (8H) |
| 4-chloro-1,2-phenylene diisopentanoate (ID#22) | | 0.91 ppm (12H), 2.20 (4H), 2.37 (2H), 7.22-7.45 (6H) |
| 4-t-butyl-1,2-phenylene bis(2-ethylhexanoate) (ID#29) | | 0.90 ppm (12H), 1.25-1.33 (17H), 1.52 (4H), 1.67 (4H), 2.31 (2H), 7.18-7.50 (3H) |

TABLE 1-continued

Internal donor structures synthesized

| Internal donor | Structure | ¹H NMR |
|---|---|---|
| Diisobutyl 2,2'-((4-tert-butyl)-1,2-pheylene)bis(oxy)diacetate (ID#26) | | 0.95 ppm (12H), 1.35 (9H), 1.97 (2H), 3.86 (4H), 4.96 (4h), 6.85-7.13 (3H) |
| 1,2-phenylenebis(methylene)dibenzoate (ID#5) | | 5.26 ppm (4H), 7.29-7.31 (4H), 7.56-8.05 (10H) |
| 5-(tert-butyl)-3-methyl-1,2-phenylene bis(3-methylbutanoate) (ID#32) | | 0.90 ppm (12H), 1.35 (9H), 2.19 (7H), 2.15 (3H), 2.39 (2H), 7.32 (2H) |

B. Magnesium Based Precursor Synthesis

Example 1: Liquid Magnesium Based Precursor

In 500 ml glass reactor maintained at 25° C., calculated amount of magnesium (powder or turnings) were weighed and added into the reactor followed by addition of calculated amount of organohalide followed by alcohol in toluene. This mixture was stirred and gradually heated to 90° C.±3. After the activation of the reaction, the mixture was allowed to be maintained at same temperature for 6 h. The resulting solution was viscous in nature. The organomagnesium compounds synthesized by the above procedure have been tabulated in Table 2.

TABLE 2

Liquid Precursor

| Precursor | Mg Ratio | Benzyl chloride Ratio | BuCl Ratio | Alcohol Ratio | Solvent | Alcohol | Mg (wt %) |
|---|---|---|---|---|---|---|---|
| MGP#161 | 1 | 1 | 0 | 1.4 | toluene | 2-ethyl-1-hexanol | 1.1 |

Example 2: Solid Magnesium Based Precursor

In 500 ml glass reactor maintained at 0° C., calculated amount of magnesium (powder or turnings) were weighed and added into the reactor followed by addition of calculated amount of organohalide followed by diethyl ether. This mixture was stirred and after the activation of the reaction, the mixture was allowed to be maintained at same temperature until all magnesium has reacted. To the resulting solution, the calculated amount of alcohol was added dropwise over a period of 1-2 h. After the completion of addition, the solution was allowed to stir for another 0.5 h. Finally, ether was evaporated and solid compound was analyzed. In case of precipitation methodology, the resulting solution prepared using magnesium and organohalide in diethyl ether was precipitated out in the desired amount of alcohol/hexane mixture

TABLE 3

Solid based precursor

| Precursor | Mg Ratio | Benzyl chloride Ratio | BuCl Ratio | Alcohol Ratio | Solvent | Alcohol | Mg (wt %) | Cl (wt %) |
|---|---|---|---|---|---|---|---|---|
| MGP#150 | 1 | 1 | 0 | 1.4 | DEE | Isobutanol | 20.2 | 21.5 |
| MGP#152 | 1 | 1 | 0 | 1.4 | DEE | Isobutanol | 21.2 | 21.2 |
| MGP#156 | 1 | 1 | 0 | 1.3 | DEE | Isobutanol | 19.1 | 24.9 |
| MGP#169 | 1 | 1 | 0 | 1.2 | DEE | Isobutanol | 14.2 | 23.6 |
| MGP#180 | 1 | 1 | 0 | 1.1 | DEE | Isobutanol | 14.4 | 24.3 |

C. Catalyst Synthesis

Into a three neck 500 ml jacketed reactor, added magnesium based precursor and phenylene dioates (see Table 1 for details). To this added 20 ml of chlorobenzene and Benzoyl chloride and the mixture was stirred for 10 min at 30° C. To this stirred solution, 180 ml of TiCl$_4$/chlorobenzene (1:1 v/v) mixture was added followed by benzoyl chloride and temperature was ramped from 30° C. to 100° C. in 60 min. This mixture was heated to 100° C. for 30 min. The mixture was allowed to settle followed by decantation. The solid component was treated with benzoylchloride and 180 ml of TiCl$_4$/chlorobenzene (1:1 v/v) mixture for 15 min. This mixture was again allowed to settle and clear solution was decanted. The solid component was again treated with benzoyl chloride and 180 ml of TiCl$_4$/chlorobenzene (1:1 v/v) mixture for 15 min. This mixture was allowed to settle and clear solution was decanted. The solid component was washed with hexane four times at 65° C. and dried under nitrogen till free flowing powder was obtained.

TABLE 4

Catalyst synthesis

| | | Precatalyst | | | | Catalyst | | | Ti | | |
|---|---|---|---|---|---|---|---|---|---|---|---|
| | | MGP | ID# | Acyl Halide | | | | | | | |
| Cat | MGP | amt (g) | amt (mmol) | (AH) (mmol) | Temp (° C.) | 1st titanation | 2nd titanation | 3rd titanation | Mg (wt %) | (wt %) | ID (wt %) |
| 307 | 150 | 10.4 | ID#18 11.09 | Benzoyl chloride 0.02 | 30 | 0.01 mmol AH | 0.006 mmol AH | 0.004 mmol AH | 17.8 | 3.1 | 14.7 |
| 315 | 150 | 10.7 | ID#18 9.62 | No Benzoyl chloride 0 | 30 | 0 | 0 | 0 | 17.4 | 4.2 | 12.0 |
| 316 | 150 | 9.9 | ID#19 7.78 | Benzoyl chloride 0.02 | 30 | 0.01 mmol AH | 0.006 mmol AH | 0.004 mmol AH | 16.7 | 3.2 | 18.6 |
| 317 | 150 | 10.6 | ID#19 7.78 | No Benzoyl chloride 0 | 30 | 0 | 0 | 0 | 17.4 | 5.2 | 8.2 |
| 318 | 150 | 10.2 | ID#9 10.17 | Benzoyl chloride 0.02 | 30 | 0.01 mmol AH | 0.006 mmol AH | 0.004 mmol AH | 18.6 | 1.6 | 17.5 |
| 319 | 150 | 9.5 | ID#9 10.17 | No Benzoyl chloride 0 | 30 | 0 | 0 | 0 | 17.7 | 2.5 | 17.4 |
| 320 | 150 | 9.9 | ID#1 11.71 | Benzoyl chloride 0.02 | 30 | 0.01 mmol AH | 0.006 mmol AH | 0.004 mmol AH | 18.3 | 3.1 | 12.8 |
| 321 | 150 | 10.2 | ID#1 11.44 | No Benzoyl chloride 0 | 30 | 0 | 0 | 0 | 16.5 | 3.4 | 18.5 |
| 322 | 152 | 9.7 | ID#22 9.29 | Benzoyl chloride 0.02 | 30 | 0.01 mmol AH | 0.006 mmol AH | 0.004 mmol AH | 17.8 | 3.1 | 14.7 |
| 323 | 152 | 10.6 | ID#22 9.29 | No Benzoyl chloride 0 | 30 | 0 | 0 | 0 | 17.6 | 4.0 | 12.0 |
| 324 | 152 | 9.5 | ID#5 8.15 | Benzoyl chloride 0.02 | 30 | 0.01 mmol AH | 0.006 mmol AH | 0.004 mmol AH | 19.1 | 1.5 | 15.9 |
| 325 | 152 | 9.7 | ID#5 7.91 | No Benzoyl chloride 0 | 30 | 0 | 0 | 0 | 16.8 | 4.1 | 14.7 |
| 326 | 152 | 10.4 | ID#26 6.33 | No Benzoyl chloride 0 | 30 | 0 | 0 | 0 | 13 | 4.1 | 29.3 |
| 327 | 152 | 10.0 | ID#26 4.31 | No Benzoyl chloride 0 | 30 | 0 | 0 | 0 | 15.9 | 3.7 | 19.7 |
| 328 | 152 | 10.0 | ID#26 3.8 | Benzoyl chloride 0.02 | 30 | 0.01 mmol AH | 0.006 mmol AH | 0.004 mmol AH | 17.2 | 3.9 | 13.9 |
| 329 | 152 | 10.0 | ID#29 7.72 | Benzoyl chloride 0.02 | 30 | 0.01 mmol AH | 0.006 mmol AH | 0.004 mmol AH | 16 | 2.6 | 23.6 |

TABLE 4-continued

Catalyst synthesis

| | | Precatalyst | | | | Catalyst | | | Ti | | |
|---|---|---|---|---|---|---|---|---|---|---|---|
| | | MGP | ID# | Acyl Halide | | | | | | | |
| Cat | MGP | amt (g) | amt (mmol) | (AH) (mmol) | Temp (°C.) | 1st titanation | 2nd titanation | 3rd titanation | Mg (wt %) | (wt %) | ID (wt %) |
| 330 | 152 | 10.0 | ID#29 7.72 | No Benzoyl chloride 0 | 30 | 0 | 0 | 0 | 18.1 | 3.9 | 10.5 |
| 345 | 156 | 9.8 | ID#32 6.61 | Benzoyl chloride 0.02 | 30 | 0.01 mmol AH | 0.006 mmol AH | 0.004 mmol AH | 17.8 | 2.9 | 15.5 |
| 346 | 156 | 10.7 | ID#32 6.61 | No Benzoyl chloride 0 | 30 | | nil yield ~10% | | 15.0 | 2.3 | 28.6 |
| 448 | 169 | 5.0 | ID#19 7.78 | No Benzoyl chloride 0 | 60 | | No titanation | | For XRD analysis | | |
| 449 | 169 | 5.1 | No ID | Benzoyl chloride 0.02 | 60 | | No titanation | | For XRD analysis | | |
| 450 | 169 | 5.1 | ID#19 7.78 | Benzoyl chloride 0.02 | 60 | | No titanation | | For XRD analysis | | |
| 451 | 169 | 9.9 | ID#19 7.78 ID addition @ 30° C. after TiCl$_4$ addition | Benzoyl chloride 0.02 | 30 | 0.01 mmol AH | 0.006 mmol AH | 0.004 mmol AH | 16.0 | 2.9 | 22.4 |
| 453 | 169 | 9.9 | ID#19 7.78 | Benzoyl chloride 0.02 Addition immediate before TiCl$_4$ addition | 30 | 0 | 0.006 mmol AH | 0.004 mmol AH | 15.6 | 3.2 | 22.8 |
| 454 | 169 | 9.9 | ID#19 7.78 | Benzoyl chloride 0.02 | 30 | 0.01 mmol AH | 0.006 mmol AH | 0.004 mmol AH | 16.5 | 2.7 | 21.3 |
| 455 | 169 | 9.9 | ID#19 7.78 | Tert-butyl benzoyl chloride 0.02 | 30 | 0.01 mmol AH | 0.006 mmol AH | 0.004 mmol AH | 15.0 | 3.8 | 22.7 |

D. Polymerization

Propylene polymerization was carried out in 1 L buchi reactor which was previously conditioned under nitrogen. The reactor was charged with 250 ml of dry hexane containing solution of 10 wt % triethylaluminum followed by 100 ml of dry hexane containing 10 wt % solution of triethylaluminum, 5 wt % solution of cyclohexylmethyldimethoxysilane (CHMDMS) and weighed amount of catalyst. The reactor was pressurized with hydrogen to 60 ml then charged with 71 psi of propylene under stirring at 750 rpm. The reactor was heated to and then held at 70° C. for 2 hour. At the end, the reactor was vented and the polymer was recovered at ambient conditions.

Catalyst performance and polymer properties has been tabulated in Table 5.

TABLE 5

Catalyst performance & Polymer properties

| CATALYST | | | POLYMERIZATION | | | | POLYMER ANALYSIS | | |
|---|---|---|---|---|---|---|---|---|---|
| Cat No | Cat wt (mg) | Al/Ti ratio | H2 ml | Al/Do mol ratio | Activity kgPP/gcat | | MFI @2.16 kg | Hexane Solubles wt % | Xylene Solubles wt % |
| 307 | 10.1 | 500 | 5 ml @1 bar | 30 | 4.6 | | 1.7 | 3.6 | 5.2 |
| 315 | 10 | 500 | 5 ml @1 bar | 30 | 5.7 | | 5.8 | 11.4 | 4.8 |
| 316 | 10 | 500 | 5 ml @1 bar | 30 | 9.4 | | 0.4 | 1.1 | 2.1 |
| 317 | 10.3 | 500 | 5 ml @1 bar | 30 | 5.4 | | 8.3 | 8 | 4.9 |
| 318 | 10.2 | 500 | 5 ml @1 bar | 30 | 13.9 | | 0.2 | 1 | 3.1 |
| 319 | 10.2 | 500 | 5 ml @1 bar | 30 | 4.2 | | 6.0 | 15.1 | 5.4 |
| 320 | 10.3 | 500 | 5 ml @1 bar | 30 | 3.8 | | 2.4 | 4.2 | 4.3 |
| 321 | 10.3 | 500 | 5 ml @1 bar | 30 | 4.4 | | 7.2 | 9.2 | 5.7 |
| 322 | 10.1 | 500 | 5 ml @1 bar | 30 | 5.3 | | 8.3 | 4.1 | 5.1 |

TABLE 5-continued

Catalyst performance & Polymer properties

| CATALYST | | POLYMERIZATION | | | | POLYMER ANALYSIS | | |
| --- | --- | --- | --- | --- | --- | --- | --- | --- |
| Cat No | Cat wt (mg) | Al/Ti ratio | H2 ml | Al/Do mol ratio | Activity kgPP/gcat | MFI @2.16 kg | Hexane Solubles wt % | Xylene Solubles wt % |
| 323 | 10.4 | 500 | 5 ml @1 bar | 30 | 6.2 | 3.4 | 3 | 5.2 |
| 324 | 10.4 | 500 | 5 ml @1 bar | 30 | 4.4 | 8.5 | 14.9 | 11.1 |
| 325 | 10.1 | 500 | 5 ml @1 bar | 30 | 5.5 | 7.3 | 4.2 | 6.5 |
| 326 | 10.1 | 500 | 5 ml @1 bar | 30 | 1.8 | na | 13 | 5.9 |
| 327 | 10.1 | 500 | 5 ml @1 bar | 30 | 2.5 | na | 22.2 | 6.4 |
| 328 | 10.4 | 500 | 5 ml @1 bar | 30 | 3.4 | 10.1 | 8.9 | 5.4 |
| 329 | 10.1 | 500 | 5 ml @1 bar | 30 | 7.6 | 0.5 | 1.4 | 2.4 |
| 330 | 10.2 | 500 | 5 ml @1 bar | 30 | 5.1 | 6.9 | 4.9 | 4.1 |
| 345 | 10.2 | 500 | 5 ml @1 bar | 30 | 4.7 | 2.2 | 3 | 6 |
| 451 | 10.4 | 500 | 5 ml @1 bar | 30 | 5.3 | 0.3 | 2.0 | 2.1 |
| 453 | 10.3 | 500 | 5 ml @1 bar | 30 | 6.9 | 0.8 | 2.0 | 4.1 |
| 454 | 10.5 | 500 | 5 ml @1 bar | 30 | 10.0 | 0.3 | 0.6 | 1.8 |
| 455 | 10.2 | 500 | 5 ml @1 bar | 30 | 5.6 | 3.1 | 0.9 | 2.0 |

In above table 5, Al/Do is mol ratio of aluminum to external donor.

E. Catalyst Synthesis Using Higher TiCl$_4$ Amount

Into a three neck 500 ml jacketed reactor, added magnesium based precursor and phenylene dioates (see Table 1 for details). To this added 20 ml of chlorobenzene and Benzoyl chloride and the mixture was stirred for 10 min at 30° C. To this stirred solution, 180 ml of TiCl$_4$ was added followed by benzoyl chloride and temperature was ramped from 30° C. to 100° C. in 60 min. This mixture was heated to 100° C. for 30 min. The mixture was allowed to settle followed by decantation. The solid component was treated with benzoyl chloride and 180 ml of TiCl$_4$ for 15 min. This mixture was again allowed to settle and clear solution was decanted. The solid component was again treated with benzoyl chloride and 180 ml of TiCl$_4$ for 15 min. This mixture was allowed to settle and clear solution was decanted. The solid component was washed with hexane four times at 65° C. and dried under nitrogen till free flowing powder was obtained.

TABLE 6

Catalyst synthesis

| | Precatalyst | | | | Catalyst | | | | Ti | |
| --- | --- | --- | --- | --- | --- | --- | --- | --- | --- | --- |
| Cat | MGP | MGP amt (g) | ID# amt (mmol) | Acyl Halide (AH) (mmol) | Temp (° C.) | 1$^{st}$ titanation | 2$^{nd}$ titanation | 3$^{rd}$ titanation | Mg (wt %) | (wt %) | ID (wt %) |
| 472 | 180 | 10 | ID#9 10.8 | Benzoyl chloride 0.02 | 30 | 0.01 mmol AH | 0.006 mmol AH | 0.004 mmol AH | 17.3 | 2.7 | 18.2 |

Table 7 shows the performance of the catalyst ZN#472 (prepared using higher TiCl$_4$) compared to ZN#316

TABLE 7

| CATALYST | | POLYMERIZATION | | | | POLYMER ANALYSIS | | |
| --- | --- | --- | --- | --- | --- | --- | --- | --- |
| Cat No | Cat wt (mg) | Al/Ti ratio | H2 ml | Al/Do ratio | Activity kgPP/gcat | MFI @2.16 kg | Hexane Solubles wt % | Xylene Solubles wt % |
| 318 | 10.2 | 500 | 5 ml @1 bar | 30 | 13.9 | 0.2 | 1 | 3.1 |
| 472 | 10.2 | 500 | 5 ml @1 bar | 30 | 13.6 | 0.2 | 1.2 | 2.9 |

Table 7 is indicative of the fact that the higher amount of TiCl$_4$ is not detrimental to catalyst performance.

We claim:
1. A process for the preparation of a catalyst component comprising:
   (i) contacting magnesium based precursor along with an internal donor based on phenylene dioates with an acyl halide in a solvent to obtain, without the addition of a transition metal halide, a solid precatalyst component; and
   (ii) contacting the solid precatalyst component with a transition metal compound to obtain the catalyst component.
2. The process of claim 1, wherein the magnesium based precursor is liquid in nature and is prepared by contacting magnesium source with an organohalide and an alcohol in presence of a solvent in a single step.
3. The process of claim 1, wherein the magnesium based precursor is solid in nature and is prepared by first contacting the magnesium source with an organohalide in presence of a solvating agent as the first step and then followed by the addition of an alcohol.
4. The process of claim 1, wherein the internal donor based on phenylene dioates has the following structure (A)

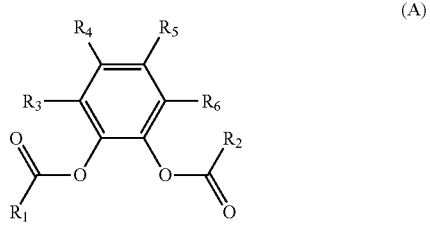

(A)

wherein $R_1$-$R_6$ groups are equal or different from each other and each of $R_1$-$R_6$ are selected from the group consisting of hydrogen, halogen, $C_1$-$C_{20}$ linear or branched alkyl group optionally linked with cyclic rings, $C_6$-$C_{14}$ aryl groups, $C_3$-$C_{15}$ cycloalkyl groups, $C_1$-$C_{20}$ alkoxy group, a heteroatom, and combinations thereof.
5. The process of claim 4, wherein in the structure (A), at least one of $R_3$-$R_6$ is selected from the group consisting of hydrogen, halogen, $C_1$-$C_{20}$ linear or branched alkyl group optionally linked with cyclic ring, $C_6$-$C_{14}$ aryl groups, $C_3$-$C_{15}$ cycloalkyl groups, $C_1$-$C_{20}$ alkoxy group, a heteroatom, and combinations thereof and at least one of $R_1$-$R_2$ selected from a group comprising of hydrogen, halogen, $C_1$-$C_{20}$ linear or branched alkyl group optionally linked with cyclic ring, $C_3$-$C_{15}$ cycloalkyl groups, a heteroatom, and combinations thereof.
6. The process of claim 1, further comprising the addition of another internal donor selected from the group consisting of phthalates, benzoates, diethers, succinates, malonates, carbonates, silyl esters, amide esters and combinations thereof.
7. The process of claim 1, wherein the acyl halide is represented by RCOX where R is H, $C_1$-$C_{20}$ is linear or branched alkyl group which optionally linked with cyclic rings, $C_6$-$C_{14}$ aryl groups, $C_3$-$C_{15}$ cycloalkyl groups, $C_1$-$C_{20}$ alkoxy group, optionally containing heteroatom and X is selected from halides.
8. The process of claim 1, wherein the molar ratio of magnesium to acyl halide is in the range of 1:5 to 1:0.0001.
9. The process of claim 1, wherein the solvent is aromatic or aliphatic and polar or non polar in nature and selected from the group consisting of benzene, decane, kerosene, ethyl benzene, chlorobenzene, dichlorobenzene, toluene, o-chlorotoluene, xylene, dichloromethane, chloroform, cyclohexane and combination thereof.
10. The process of claim 1, wherein the contact time of the step (i) is immediate to 5 h, and heated to a temperature within the range of 10° C. to 200° C.
11. The process of claim 1, wherein the magnesium based precursor is contacted first with the internal donor followed by the contact of the acyl halide or magnesium based precursor is first contacted with the acyl halide followed by the contact with internal donor or the internal donor is mixed with the acyl halide and then contacted with the magnesium precursor in presence of the solvent.
12. The process of claim 1, wherein the solid precatalyst component is isolated.
13. The process of claim 1, wherein the transition metal compound is selected from compounds represented by M(OR')$_p$X$_{4-p}$, where M is a transition metal and is selected from the group consisting of Ti, V, Zr, and Hf; X is a halogen atom; R' is a hydrocarbon group and p is an integer having value equal to or less than 4, the transition metal halide is selected from the group consisting of transition metal tetrahalide, alkoxy transition metal trihalide/aryloxy transition metal trihalide, dialkoxy transition metal dihalide, trialkoxy transition metal monohalide, tetraalkoxy transition metal, and mixtures thereof wherein:
   (a) the transition metal tetrahalide is selected from the group consisting of titanium tetrachloride, titanium tetrabromide and titanium tetraiodide and the likes for V, Zr and Hf;
   (b) alkoxy transition metal trihalide/aryloxy transition metal trihalide is selected from the group consisting of methoxytitanium trichloride, ethoxytitanium trichloride, butoxytitanium trichloride and phenoxytitanium trichloride and the likes for V, Zr and Hf;
   (c) dialkoxy transition metal dihalide is diethoxy transition metal dichloride and the likes for V, Zr and Hf;
   (d) trialkoxy transition metal monohalide is triethoxy transition metal chloride and the likes for V, Zr and Hf; and
   (e) tetraalkoxy transition metal is selected from the group consisting of tetrabutoxy titanium and tetraethoxy titanium and the likes for V, Zr and Hf.
14. The process of claim 1, wherein the solid precatalyst component is contacted with the transition metal compound at a temperature in the range of −50° C. to 150° C., and is then heated at a rate of 0.1 to 10.0° C./minute.
15. The process of claim 1, wherein the transition metal compound is added in amounts ranging from 1 to 20 moles with respect to one mole of magnesium.
16. The process of claim 1, wherein the contact with transition metal compound is either neat or in solvent, and wherein the solvent is selected from the group consisting of chlorinated aromatic hydrocarbon, non chlorinated aromatic hydrocarbon, chlorinated aliphatic hydrocarbon, non chlorinated aliphatic hydrocarbon and combination thereof.
17. The process of claim 16, wherein the solvent is comprising from 40 to 60 volume percent and selected from the group consisting of benzene, decane, kerosene, ethyl benzene, chlorobenzene, dichlorobenzene, toluene, o-chlorotoluene, xylene, dichloromethane, chloroform, cyclohexane and combination thereof.

18. The process of claim 1, further comprising, repeating the contacting step (ii), one or more times for at least 10 minutes up to 60 minutes, at a temperature from about 25° C. to about 150° C.

19. The process of claim 18, wherein acyl halides is added prior to each contacting step (ii) and said addition of acyl halides is carried out for immediate to 30 min.

20. A process for preparation of a catalyst system, said process comprising contacting the catalyst composition as obtained by claim 1 with at least one cocatalyst, and at least one external electron donor to obtain the catalyst system.

21. A process of polymerizing and/or copolymerizing olefins to obtain a polyolefins having bulk densities (BD) of at least about 0.3 g/cc, said process comprising the step of contacting an olefin having $C_2$ to $C_{20}$ carbon atoms under a polymerizing condition with the catalyst system as obtained by claim 20.

* * * * *